(12) United States Patent
Kuwana et al.

(10) Patent No.: US 11,560,453 B2
(45) Date of Patent: Jan. 24, 2023

(54) POLYORGANOSILSESQUIOXANE, HARD COAT FILM, ADHESIVE SHEET, AND LAMINATE

(71) Applicant: DAICEL CORPORATION, Osaka (JP)

(72) Inventors: Akihiro Kuwana, Himeji (JP); Nobuhiko Harada, Himeji (JP); Maya Masui, Himeji (JP); Ichiro Takase, Himeji (JP); Shinji Maetani, Himeji (JP); Naoko Tsuji, Himeji (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/394,031

(22) Filed: Aug. 4, 2021

(65) Prior Publication Data

US 2022/0002494 A1 Jan. 6, 2022

Related U.S. Application Data

(62) Division of application No. 16/000,313, filed on Jun. 5, 2018, now Pat. No. 11,111,337, which is a division (Continued)

(30) Foreign Application Priority Data

Dec. 13, 2013 (JP) ................................. 2013-257900
Feb. 25, 2014 (JP) ................................. 2014-034689
(Continued)

(51) Int. Cl.
*C08G 77/14* (2006.01)
*C09D 183/06* (2006.01)
(Continued)

(52) U.S. Cl.
CPC ................ *C08G 77/14* (2013.01); *B32B 7/12* (2013.01); *B32B 9/005* (2013.01); *B32B 9/045* (2013.01);
(Continued)

(58) Field of Classification Search
CPC ........ C08G 77/14; C08G 59/24; C08G 59/02; C08G 59/3281; C08G 59/4064;
(Continued)

(56) References Cited

U.S. PATENT DOCUMENTS

| 5,650,453 | A | | 7/1997 | Eckberg et al. |
| 5,891,969 | A | * | 4/1999 | Mine ...................... C08L 63/00 525/476 |

(Continued)

FOREIGN PATENT DOCUMENTS

| EP | 1 593 703 A1 | 11/2005 |
| JP | 2004-346144 A | 12/2004 |

(Continued)

OTHER PUBLICATIONS

International Preliminary Report on Patentability (PCT/IPEA/409) issued in PCT/JP2014/080832, completed on Dec. 14, 2015.
(Continued)

*Primary Examiner* — Michael B Nelson
(74) *Attorney, Agent, or Firm* — Birch, Stewart, Kolasch & Birch, LLP

(57) ABSTRACT

Provided is a polyorganosilsesquioxane capable of forming, when cured, a cured product that offers high surface hardness and good heat resistance, is highly flexible, and has excellent processability. The present invention relates to a polyorganosilsesquioxane including a constitutional unit represented by Formula (1). The polyorganosilsesquioxane includes a constitutional unit represented by Formula (I) and a constitutional unit represented by Formula (II) in a mole
(Continued)

ratio of the constitutional unit represented by Formula (I) to the constitutional unit represented by Formula (II) of 5 or more. The polyorganosilsesquioxane has a total proportion of the constitutional unit represented by Formula (1) and a constitutional unit represented by Formula (4) of 55% to 100% by mole based on the total amount (100% by mole) of all siloxane constitutional units. The polyorganosilsesquioxane has a number-average molecular weight of 1000 to 3000 and a molecular-weight dispersity (weight-average molecular weight to number-average molecular weight ratio) of 1.0 to 3.0.

$$[R^1SiO_{3/2}] \quad (1)$$

[Chem. 2]

$$[R^aSiO_{3/2}] \quad (I)$$

[Chem. 3]

$$[R^bSiO(OR^c)] \quad (II)$$

[Chem. 4]

$$[R^1SiO(OR^c)] \quad (4)$$

11 Claims, 1 Drawing Sheet

Related U.S. Application Data of application No. 15/100,733, filed as application No. PCT/JP2014/080832 on Nov. 14, 2014, now abandoned.

(30) Foreign Application Priority Data

Apr. 16, 2014 (JP) ................................ 2014-084592
Sep. 4, 2014 (JP) ................................ 2014-179898

(51) Int. Cl.
| | | |
|---|---|---|
| C09J 183/06 | (2006.01) | |
| C08L 83/06 | (2006.01) | |
| C08G 59/24 | (2006.01) | |
| C08L 63/00 | (2006.01) | |
| B32B 9/00 | (2006.01) | |
| B32B 9/04 | (2006.01) | |
| B32B 15/08 | (2006.01) | |
| B32B 21/08 | (2006.01) | |
| B32B 27/08 | (2006.01) | |
| B32B 27/28 | (2006.01) | |
| C08K 5/5415 | (2006.01) | |
| C09J 7/20 | (2018.01) | |
| C08J 7/043 | (2020.01) | |
| C08J 7/048 | (2020.01) | |
| B32B 7/12 | (2006.01) | |

(52) U.S. Cl.
CPC .............. *B32B 15/08* (2013.01); *B32B 21/08* (2013.01); *B32B 27/08* (2013.01); *B32B 27/28* (2013.01); *B32B 27/283* (2013.01); *C08G 59/24* (2013.01); *C08J 7/043* (2020.01); *C08J 7/048* (2020.01); *C08K 5/5415* (2013.01); *C08L 63/00* (2013.01); *C08L 83/06* (2013.01); *C09D 183/06* (2013.01); *C09J 7/20* (2018.01); *C09J 183/06* (2013.01); *B32B 2250/02* (2013.01); *B32B 2250/03* (2013.01); *B32B 2255/26* (2013.01); *B32B 2307/306* (2013.01); *B32B 2307/536* (2013.01); *B32B 2307/546* (2013.01); *B32B 2307/732* (2013.01); *B32B 2405/00* (2013.01); *B32B 2457/208* (2013.01); *C09J 2483/00* (2013.01); *Y10T 428/31504* (2015.04); *Y10T 428/31663* (2015.04)

(58) Field of Classification Search
CPC .......... B32B 7/12; B32B 9/005; B32B 9/045; B32B 15/08; B32B 21/08; B32B 27/08; B32B 27/28; B32B 27/283; B32B 2250/02; B32B 2250/03; B32B 2255/26; B32B 2307/306; B32B 2307/536; B32B 2307/546; B32B 2307/732; B32B 2405/00; B32B 2457/208; C08J 7/043; C08J 7/048; C08K 5/5415; C08K 5/549; C08L 63/00; C08L 83/06; C09D 183/06; C09D 163/00; C09J 7/20; C09J 183/06; C09J 2483/00; C09J 183/04; C09J 7/30
See application file for complete search history.

(56) References Cited

U.S. PATENT DOCUMENTS

| | | | |
|---|---|---|---|
| 2006/0135723 A1 | 6/2006 | Nakayama | |
| 2006/0222999 A1* | 10/2006 | Miyazaki | C08G 59/62 430/280.1 |
| 2008/0249271 A1 | 10/2008 | Beppu | |
| 2011/0054063 A1 | 3/2011 | Ooike et al. | |
| 2013/0331476 A1* | 12/2013 | Bae | C08G 59/42 523/435 |
| 2015/0159044 A1* | 6/2015 | Bae | C08G 59/3281 523/435 |
| 2015/0353760 A1 | 12/2015 | Bae et al. | |
| 2016/0297933 A1 | 10/2016 | Kuwana | |

FOREIGN PATENT DOCUMENTS

| | | |
|---|---|---|
| JP | 2008-248236 A | 10/2008 |
| JP | 2009-279840 A | 12/2009 |
| JP | 2012-62457 A | 3/2012 |
| JP | 2012-116989 A | 6/2012 |
| JP | 2012-180463 A1 | 9/2012 |
| JP | 2013-170013 A | 9/2013 |
| JP | 2014-169433 A | 9/2014 |
| JP | 2015-112599 A | 6/2015 |
| JP | 2016-506997 A | 3/2016 |
| JP | 6219250 B2 | 10/2017 |
| WO | WO 2004/072150 A1 | 8/2004 |
| WO | WO 2009/090916 A1 | 7/2009 |

OTHER PUBLICATIONS

International Search Report (PCT/ISA/210) issued in PCT/JP2014/080832, dated Feb. 17, 2015.
Korean Notice of Final Rejection dated Jun. 9, 2017, for Korean Application No. 10-2016-7013529, with English translation.
Written Opinion (PCT/ISA/237) issued in PCT/JP2014/080832, dated Feb. 17, 2015.

* cited by examiner

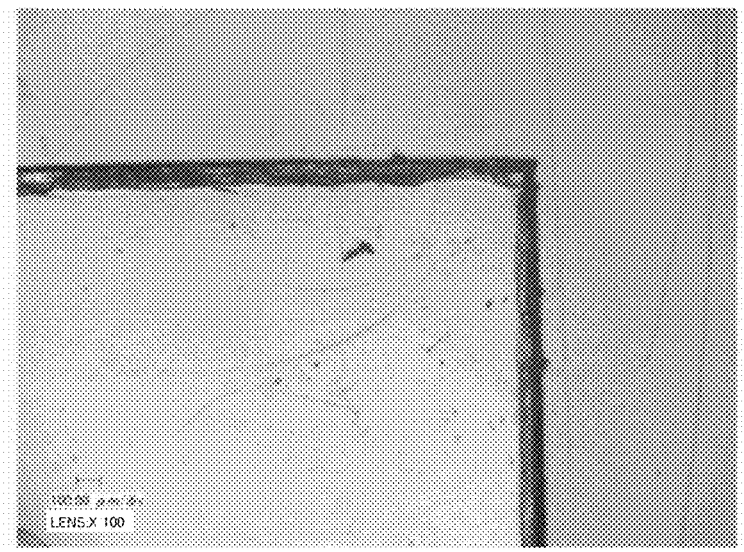

POLYORGANOSILSESQUIOXANE, HARD COAT FILM, ADHESIVE SHEET, AND LAMINATE

CROSS REFERENCE TO RELATED APPLICATIONS

This application is a Divisional of copending U.S. application Ser. No. 16/000,313, filed on Jun. 5, 2018, which is a Divisional of U.S. application Ser. No. 15/100,733, filed on Jun. 1, 2016, which is a National Phase of PCT International Application No. PCT/JP2014/080832 on Nov. 14, 2014, which claims the benefit under 35 U.S.C. § 119(a) to Patent Application No. 2014-179898, filed in Japan on Sep. 4, 2014, Patent Application No. 2014-084592, filed in Japan on Apr. 16, 2014, Patent Application No. 2014-034689, filed in Japan on Feb. 25, 2014, and Patent Application No. 2013-257900, filed in Japan on Dec. 13, 2013, all of which are hereby expressly incorporated by reference into the present application.

TECHNICAL FIELD

The present invention relates to a polyorganosilsesquioxane, to a curable composition containing the polyorganosilsesquioxane, and to a cured product of the curable composition. The present invention also relates to a hard coat film including a hard coat layer derived from a hard-coating composition (hard-coating agent) containing the polyorganosilsesquioxane. The present invention further relates to a composition (adhesive composition) containing the polyorganosilsesquioxane and to an adhesive sheet and a laminate each prepared using the composition.

BACKGROUND ART

Some conventionally distributed hard coat films include a substrate and, on one or both sides of the substrate, a hard coat layer that has a pencil hardness of about 3H on a surface thereof. The hard coat layer in the hard coat films is mainly formed from a material selected from UV-curable acrylic monomers (e.g., see Patent Literature (PTL) 1). For higher pencil hardness of the hard coat layer surface, some hard coat films further contain nanoparticles in the hard coat layer.

In contrast, glass is known as a material having extremely high surface hardness. Among such glass, there is known glass that has been subjected to an alkali ion exchange treatment and has a higher surface pencil hardness of up to 9H. However, due to its poor flexibility and processability, such glass cannot be subjected to production and processing in a roll form by a roll-to-roll process, but is required to be produced and processed in a sheet form. This leads to high production cost.

CITATION LIST

Patent Literature

PTL 1: Japanese Unexamined Patent Application Publication (JP-A) No. 2009-279840

SUMMARY OF INVENTION

Technical Problem

However, the hard coat films prepared using the UV-curable acrylic monomers are not yet considered to have sufficient surface hardness. In general, as possible solutions to offer higher hardness, a multifunctional UV-curable acrylic monomer is used and/or the hard coat layer is formed to be thick. Disadvantageously, however, these solutions cause the hard coat layer to undergo larger cure shrinkage and consequently cause the hard coat film to suffer from curling and/or cracking. Assume that the hard coat layer further contains nanoparticles. Unfortunately in this case, the nanoparticles aggregate to cause the hard coat layer to haze, when the nanoparticles have poor compatibility with the UV-curable acrylic monomer.

In contrast, the alkali ion exchange treatment of the glass disadvantageously yields a large amount of alkaline wastewater and puts a heavy load on the environment. Further disadvantageously, such glass is heavy and fragile and leads to high cost. Under these circumstances, demands have been made to provide organic materials that offer flexibility and processability at excellent levels and have high surface hardness.

In addition, recently, such hard coat films have been applied onto a wider and wider range of uses. This demands that the hard coat layers of the hard coat films have high surface hardness as described above and, in particular, have excellent heat resistance. However, the hard coat layers in the hard coat films prepared using the UV-curable acrylic monomers are considered to be insufficient also from the viewpoint of heat resistance.

Accordingly, the present invention has an object to provide a polyorganosilsesquioxane capable of forming, when cured, a cured product that offers high surface hardness and good heat resistance, is highly flexible, and has excellent processability.

The present invention has another object to provide a hard coat film that is still flexible and is producible and processable by a roll-to-roll process even while sustaining high surface hardness and good heat resistance.

The present invention has yet another object to provide the hard coat film that is processable by punching.

The present invention has still another object to provide an adhesive composition (adhesive) capable of forming a cured product (adhesive member) that has high heat resistance and is highly flexible; and an adhesive sheet and a laminate each prepared using the adhesive composition (adhesive).

Solution to Problem

The inventors of the present invention found a polyorganosilsesquioxane that includes an epoxy-containing silsesquioxane constitutional unit (unit structure), has proportions or ratios of specific structures (a ratio of a T3 unit to a T2 unit, and the proportion of the epoxy-containing silsesquioxane constitutional unit) each controlled within specific ranges, and has a number-average molecular weight and a molecular-weight dispersity controlled within specific ranges. The inventors found that a curable composition containing the polyorganosilsesquioxane, when cured, forms a cured product that offers high surface hardness and good heat resistance, is highly flexible, and has excellent processability. The inventors also found a hard coat film including a hard coat layer derived from a hard-coating composition containing the polyorganosilsesquioxane and found that this hard coat film is still flexible and is producible and processable by a roll-to-roll process even while sustaining high surface hardness and good heat resistance. In addition, the inventors found that a curable composition containing the polyorganosilsesquioxane is advantageously usable as an adhesive composition (adhesive) that forms a cured product (adhesive member) having high heat resistance and being highly flexible. The present invention has been made based on these findings.

Specifically, the present invention provides, in one aspect, a polyorganosilsesquioxane including a constitutional unit represented by Formula (1):

[Chem. 1]

$$[R^1 SiO_{3/2}] \quad (1)$$

wherein $R^1$ represents an epoxy-containing group. The polyorganosilsesquioxane includes a constitutional unit represented by Formula (I) and a constitutional unit represented by Formula (II) in a mole ratio of the constitutional unit represented by Formula (I) to the constitutional unit represented by Formula (II) of 5 or more. Formulae (I) and (II) are expressed as follows:

[Chem. 2]

$$[R^a SiO_{3/2}] \quad (I)$$

where $R^a$ is selected from an epoxy-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, and a hydrogen atom,

[Chem. 3]

$$[R^b SiO(OR^c)] \quad (II)$$

where $R^b$ is selected from an epoxy-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, and a hydrogen atom; and $R^c$ is selected from a hydrogen atom and a $C_1$-$C_4$ alkyl group. The polyorganosilsesquioxane has a total proportion of the constitutional unit represented by Formula (1) and a constitutional unit represented by Formula (4) of 55% to 100% by mole based on the total amount (100% by mole) of all siloxane constitutional units. Formula (4) is expressed as follows:

[Chem. 4]

$$[R^1 SiO(OR^c)] \quad (4)$$

where $R^1$ is as defined in Formula (1); and $R^c$ is as defined in Formula (II). The polyorganosilsesquioxane has a number-average molecular weight of 1000 to 3000 and a molecular-weight dispersity (weight-average molecular weight to number-average molecular weight ratio) of 1.0 to 3.0.

The polyorganosilsesquioxane may further include a constitutional unit represented by Formula (2):

[Chem. 5]

$$[R^2 SiO_{3/2}] \quad (2)$$

where $R^2$ is selected from a substituted or unsubstituted aryl group, a substituted or unsubstituted aralkyl group, a substituted or unsubstituted cycloalkyl group, a substituted or unsubstituted alkyl group, and a substituted or unsubstituted alkenyl group.

In the polyorganosilsesquioxane, $R^1$ may be selected from a group represented by Formula (1a), a group represented by Formula (1b), a group represented by Formula (1c), and a group represented by Formula (1d). Formulae (1a), (1b), (1c), and (1c) are expressed as follows:

[Chem. 6]

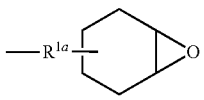
(1a)

where $R^{1a}$ represents a straight or branched chain alkylene group,

[Chem. 7]

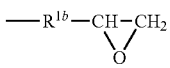
(1b)

where $R^{1b}$ represents a straight or branched chain alkylene group,

[Chem. 8]

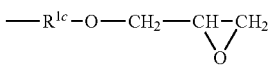
(1c)

where $R^{1c}$ represents a straight or branched chain alkylene group,

[Chem. 9]

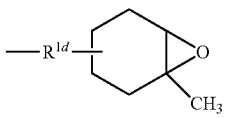
(1d)

where $R^{1d}$ represents a straight or branched chain alkylene group.

In the polyorganosilsesquioxane, $R^2$ is preferably a substituted or unsubstituted aryl group.

The present invention provides, in another aspect, a curable composition containing the polyorganosilsesquioxane.

The curable composition may further contain a curing catalyst.

The curing catalyst in the curable composition may be a cationic photoinitiator.

The curing catalyst in the curable composition may be a cationic thermal initiator.

The curable composition may further contain a vinyl ether compound.

The vinyl ether compound in the curable composition may include a vinyl ether compound containing a hydroxy group in the molecule.

The curable composition may be a curable composition for the formation of a hard coat layer.

The curable composition may also be an adhesive composition.

The present invention provides, in yet another aspect, a cured product of the curable composition.

In still another aspect, the present invention provides a hard coat film that includes a substrate, and a hard coat layer disposed on or over at least one side of the substrate. The hard coat layer is a layer of a cured product of the curable composition.

The hard coat layer in the hard coat film may have a thickness of 1 to 200 μm.

The hard coat film may be producible by a roll-to-roll process.

The hard coat film may further include a surface-protecting film on a surface of the hard coat layer.

The present invention provides, in another aspect, a method for producing a hard coat film. The method includes Step A, Step B, and Step C. In Step A, a wound (rolled) substrate is unwound. In Step B, the curable composition is applied onto at least one side of the unwound substrate, and the applied curable composition is cured to form a hard coat layer on the substrate to thereby give a hard coating film. In Step C, the resulting hard coating film is rewound into a roll. Steps A, B, and C are successively performed.

In another aspect, the present invention provides an adhesive sheet that includes a substrate, and an adhesive layer disposed on or over the substrate. The adhesive layer is a layer of the curable composition.

In addition and advantageously, the present invention provide a laminate including three or more layers. The three or more layers include two adherend layers, and an adhesive layer between the two adherend layers. The adhesive layer is a layer of a cured product of the curable composition.

Advantageous Effects of Invention

The polyorganosilsesquioxane according to the present invention has the configuration. Assume that the polyorganosilsesquioxane is incorporated as an essential component into a curable composition, and the curable composition is cured. The curable composition in this case forms a cured product that offers high surface hardness and good heat resistance, is highly flexible, and has excellent processability. The hard coat film according to the present invention has the configuration, is therefore still flexible and is producible and processable by a roll-to-roll process even while sustaining high surface hardness and good heat resistance. The hard coat film according to the present invention is therefore excellent both in quality and cost. The curable composition containing the polyorganosilsesquioxane according to the present invention as an essential component is also advantageously usable as an adhesive composition (adhesive) that forms a cured product (adhesive member) having high heat resistance and being highly flexible. The use of the adhesive composition gives an adhesive sheet and a laminate.

BRIEF DESCRIPTION OF DRAWING

FIG. 1 is a photomicrograph (at 100-fold magnification) of ends of a hard coat film prepared in Example 20, which is a sample after punching.

DESCRIPTION OF EMBODIMENTS

Polyorganosilsesquioxane

The polyorganosilsesquioxane (silsesquioxane) according to the present invention includes a constitutional unit represented by Formula (1). The polyorganosilsesquioxane includes a constitutional unit represented by Formula (I) and a constitutional unit represented by Formula (II) in a mole ratio of the constitutional unit represented by Formula (I) to the constitutional unit represented by Formula (II) of 5 or more. The constitutional unit represented by Formula (I) is also referred to as a "T3 unit". The constitutional unit represented by Formula (II) is also referred to as a "T2 unit". The mole ratio of the constitutional unit represented by Formula (I) to the constitutional unit represented by Formula (II) is also referred to as a "T3 to T2 ratio". The polyorganosilsesquioxane has a total proportion of the constitutional unit represented by Formula (1) and an after-mentioned constitutional unit represented by Formula (4) of 55% to 100% by mole based on the total amount (100% by mole) of all siloxane constitutional units. The polyorganosilsesquioxane has a number-average molecular weight of 1000 to 3000 and a molecular-weight dispersity of 1.0 to 3.0, where the molecular-weight dispersity is the ratio of the weight-average molecular weight to the number-average molecular weight. Formulae (1), (I), and (II) are expressed as follows:

[Chem. 10]

$$[R^1SiO_{3/2}] \qquad (1)$$

[Chem. 11]

$$[R^aSiO_{3/2}] \qquad (I)$$

[Chem. 12]

$$[R^bSiO(OR^c)] \qquad (II)$$

The constitutional unit represented by Formula (1) is a silsesquioxane constitutional unit (so-called T unit) generally represented by the formula: $RSiO_{3/2}$. R in the formula is selected from a hydrogen atom and a monovalent organic group. This definition is also applied to the following description. The constitutional unit represented by Formula (1) is derived from a corresponding hydrolyzable trifunctional silane compound via hydrolysis and condensation reaction. The corresponding hydrolyzable trifunctional silane compound is exemplified by, but is not limited to, after-mentioned compounds represented by Formula (a).

In Formula (1), $R^1$ represents an epoxy-containing group (monovalent group). Specifically, the polyorganosilsesquioxane according to the present invention is a cationically curable compound (cationically polymerizable compound) that contains an epoxy group in the molecule. The epoxy-containing group may be selected from, but is not limited to, known or common groups containing an oxirane ring. Among them, preferred are groups represented by Formula (1a), groups represented by Formula (1b), groups represented by Formula (1c), and groups represented by Formula (1d); of which the groups represented by Formula (1a) and the groups represented by Formula (1) are preferred, and the groups represented by Formula (1a) are more preferred. These are preferred from the viewpoints of curability of the curable composition, and surface hardness and heat resistance of the cured product. Formulae (1a), (1b), (1c), and (1d) are expressed as follows:

[Chem. 13]

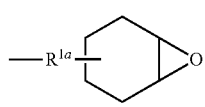

(1a)

-continued

[Chem. 14]

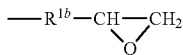
(1b)

[Chem. 15]

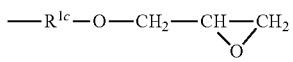
(1c)

[Chem. 16]

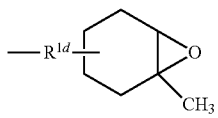
(1d)

In Formula (1a), $R^{1a}$ represents a straight or branched chain alkylene group. Examples of the straight or branched chain alkylene group include, but are not limited to, $C_1$-$C_{10}$ straight or branched chain alkylene groups such as methylene, methylmethylene, dimethylmethylene, ethylene, propylene, trimethylene, tetramethylene, pentamethylene, hexamethylene, and decamethylene groups. In particular, Ria is preferably selected from $C_1$-$C_4$ straight chain alkylene groups and $C_3$ and $C_4$ branched chain alkylene groups, more preferably selected from ethylene, trimethylene, and propylene groups, and furthermore preferably selected from ethylene and trimethylene groups. These are preferred from the viewpoints of surface hardness and curability of the cured product.

In Formula (1b), $R^{1b}$ represents a straight or branched chain alkylene group and is exemplified by groups as with Ria. In particular, $R^{1b}$ is preferably selected from $C_1$-$C_4$ straight chain alkylene groups and $C_3$ and $C_4$ branched chain alkylene groups, more preferably selected from ethylene, trimethylene, and propylene groups, and furthermore preferably selected from ethylene and trimethylene groups. These are preferred from the viewpoints of surface hardness and curability of the cured product.

In Formula (1c), $R^{1c}$ represents a straight or branched chain alkylene group, and is exemplified by groups as with $R^{1a}$. In particular, $R^{1c}$ is preferably selected from $C_1$-$C_4$ straight chain alkylene groups and $C_3$ and $C_4$ branched chain alkylene groups, more preferably selected from ethylene, trimethylene, and propylene groups, and furthermore preferably selected from ethylene and trimethylene groups. These are preferred from the viewpoints of surface hardness and curability of the cured product.

In Formula (1d), $R^{1d}$ represents a straight or branched chain alkylene group, and is exemplified by groups as with Ria. In particular, $R^{1d}$ is preferably selected from $C_1$-$C_4$ straight chain alkylene groups and $C_3$ and $C_4$ branched chain alkylene groups, more preferably selected from ethylene, trimethylene, and propylene groups, and furthermore preferably selected from ethylene and trimethylene groups. These are preferred from the viewpoints of surface hardness and curability of the cured product.

In particular, $R^1$ in Formula (1) is preferably selected from the groups represented by Formula (1a) in which $R^{1a}$ is ethylene group, and is more preferably 2-(3',4'-epoxycyclohexyl)ethyl group.

The polyorganosilsesquioxane according to the present invention may include one type of the constitutional unit represented by Formula (1) alone or may include two or more different constitutional units represented by Formula (1).

In addition to the constitutional unit represented by Formula (1), the silsesquioxane constitutional unit ($RSiO_{3/2}$) in the polyorganosilsesquioxane according to the present invention may further include a constitutional unit represented by Formula (2):

[Chem. 17]

$$[R^2SiO_{3/2}] \quad (2)$$

The constitutional unit represented by Formula (2) is a silsesquioxane constitutional unit (T unit) generally represented by the formula: $RSiO_{3/2}$. Specifically, the constitutional unit represented by Formula (2) is derived from a corresponding hydrolyzable trifunctional silane compound via hydrolysis and condensation reaction. The hydrolyzable trifunctional silane compound is exemplified by, but is not limited to, after-mentioned compounds represented by Formula (b).

In Formula (2), $R^2$ is selected from a substituted or unsubstituted aryl group, a substituted or unsubstituted aralkyl group, a substituted or unsubstituted cycloalkyl group, a substituted or unsubstituted alkyl group, and a substituted or unsubstituted alkenyl group. Non-limiting examples of the aryl group include phenyl, tolyl, and naphthyl groups. Non-limiting examples of the aralkyl group include benzyl and phenethyl groups. Non-limiting examples of the cycloalkyl group include cyclobutyl, cyclopentyl, and cyclohexyl groups. Examples of the alkyl group include, but are not limited to, straight or branched chain alkyl groups such as methyl, ethyl, propyl, n-butyl, isopropyl, isobutyl, s-butyl, t-butyl, and isopentyl groups. Examples of the alkenyl group include, but are not limited to, straight or branched chain alkenyl groups such as vinyl, allyl, and isopropenyl groups.

The substituted aryl, substituted aralkyl, substituted cycloalkyl, substituted alkyl, and substituted alkenyl groups are exemplified by, but are not limited to, groups respectively corresponding to the aryl, aralkyl, cycloalkyl, alkyl, and alkenyl groups, except with part or all of hydrogen atoms or backbone skeleton of the corresponding compound being substituted with at least one selected from the group consisting of ether group, ester group, carbonyl group, siloxane group, halogen atoms (e.g., fluorine atom), acrylic group, methacrylic group, mercapto group, amino group, and hydroxy group.

In particular, $R^2$ is preferably selected from substituted or unsubstituted aryl groups, substituted or unsubstituted alkyl groups, and substituted or unsubstituted alkenyl groups, is more preferably selected from substituted or unsubstituted aryl groups, and is furthermore preferably phenyl group.

The proportions of the silsesquioxane constitutional units (the constitutional unit represented by Formula (1) and the constitutional unit represented by Formula (2)) in the polyorganosilsesquioxane according to the present invention can be adjusted as appropriate by the composition (formulation) of starting materials (hydrolyzable trifunctional silanes) to form these constitutional units.

The polyorganosilsesquioxane according to the present invention may further include, other than the constitutional unit represented by Formula (1) and the constitutional unit represented by Formula (2), at least one siloxane constitutional unit selected from the group consisting of silsesquioxane constitutional units ($RSiO_{3/2}$) excluding the constitutional unit represented by Formula (1) and the constitutional unit represented by Formula (2); constitutional units represented by the formula: $R_3SiO_{1/2}$ (so-called M units); constitutional units represented by the formula: $R^2SiO$ (so-called D units); and constitutional units represented by the formula $SiO_2$ (so-called Q units). A non-limiting example of the silsesquioxane constitutional units excluding the constitutional unit represented by Formula (1) and the constitutional unit represented by Formula (2) includes a constitutional unit represented by Formula (3):

[Chem. 18]

$$[HSiO_{3/2}] \qquad (3)$$

The polyorganosilsesquioxane according to the present invention includes a constitutional unit represented by Formula (I) and a constitutional unit represented by Formula (II) in a T3 to T2 ratio of the constitutional unit represented by Formula (I) (T3 unit) to the constitutional unit represented by Formula (II) (T2 unit) of 5 or more, as described above. The T3 to T2 ratio is preferably 5 to 18, more preferably 6 to 16, and furthermore preferably 7 to 14. The polyorganosilsesquioxane, as having a T3 to T2 ratio of 5 or more, contributes to significantly higher surface hardness and adhesiveness of the cured product and the hard coat layer.

The constitutional unit represented by Formula (I) is more specifically represented by Formula (I') below. The constitutional unit represented by Formula (II) is more specifically represented by Formula (II') below. The three oxygen atoms bonded to the silicon atom specified in the structure represented by Formula (I') are bonded respectively to other silicon atoms (silicon atoms not shown in Formula (I')). In contrast, the two oxygen atoms respectively positioned above and below the silicon atom specified in the structure represented by Formula (II') are bonded respectively to other silicon atoms (silicon atoms not shown in Formula (II')). Specifically, the T3 unit and the T2 unit are constitutional units (T units) derived from corresponding hydrolyzable trifunctional silane compounds via hydrolysis and condensation reaction. Formulae (I') and (II') are expressed as follows:

[Chem. 19]

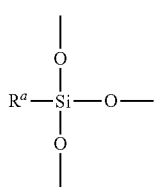

(I')

[Chem. 20]

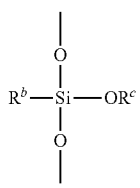

(II')

$R^a$ in Formula (I) (as with $R^a$ in Formula (I')) and $R^b$ in Formula (II) (as with $R^b$ in Formula (II')) are each independently selected from an epoxy-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, and a hydrogen atom. Examples of $R^a$ and $R^b$ are as with $R^1$ in Formula (1) and $R^2$ in Formula (2). $R^a$ in Formula (I) and $R^b$ in Formula (II) are independently derived from groups (groups excluding alkoxy groups and halogen atoms) bonded to silicon atom(s) in hydrolyzable trifunctional silane compounds used as starting materials to form the polyorganosilsesquioxane according to the present invention. Examples of the groups (excluding alkoxy groups and halogen atoms) bonded to the silicon atoms include, but are not limited to, $R^1$, $R^2$, and hydrogen atom in after-mentioned Formulae (a), (b), and (c).

$R^c$ in Formula (II) (as with $R^c$ in Formula (II')) is selected from a hydrogen atom and a $C_1$-$C_4$ alkyl group. Non-limiting examples of the $C_1$-$C_4$ alkyl group include $C_1$-$C_4$ straight or branched chain alkyl groups such as methyl, ethyl, propyl, isopropyl, butyl, and isobutyl groups. In general, the alkyl group as $R^c$ in Formula (II) is derived from an alkoxy group in the hydrolyzable silane compound used as a starting material to form the polyorganosilsesquioxane according to the present invention. The alkoxy group herein is exemplified by after-mentioned alkoxy groups as $X^1$ to $X^3$.

The T3 to T2 ratio in the polyorganosilsesquioxane according to the present invention may be determined typically by $^{29}$Si-NMR spectrum measurement. In the $^{29}$Si-NMR spectrum, the silicon atom in the constitutional unit (T3 unit) represented by Formula (I) and the silicon atom in the constitutional unit (T2 unit) represented by Formula (II) offer signals (peaks) at different positions (different chemical shifts). The integral ratio between these peaks are calculated to determine the T3 to T2 ratio. Specifically, for example, assume that the polyorganosilsesquioxane according to the present invention includes a constitutional unit represented by Formula (1) in which $R^1$ is a 2-(3',4'-epoxycyclohexyl)ethyl group. In this case, the silicon atom in the structure (T3 unit) represented by Formula (I) offers a signal appearing at −64 to −70 ppm, the silicon atom in the structure (T2 unit) represented by Formula (II) offers a signal appearing at −54 to −60 ppm. In this case, the integral ratio of the signal appearing at −64 to −70 ppm (assigned to the T3 unit) to the signal appearing at −54 to −60 ppm (assigned to the T2 unit) is calculated to determine the T3 to T2 ratio.

The $^{29}$Si-NMR spectrum of the polyorganosilsesquioxane according to the present invention may be determined typically with an apparatus under conditions as follows.

Measuring apparatus: trade name JNM-ECA500 NMR (supplied by JEOL Ltd.)
Solvent: deuterated chloroform
Number of scans: 1800
Measurement temperature: 25° C.

The fact that the polyorganosilsesquioxane according to the present invention has a T3 to T2 ratio of 5 or more means that the polyorganosilsesquioxane according to the present invention includes both the T3 unit and the T2 unit and includes the T2 unit in an amount at a specific level or higher relative to the T3 unit. Non-limiting examples of the T2 unit include constitutional units represented by Formula (4), constitutional units represented by Formula (5), and constitutional units represented by Formula (6). $R^1$ in Formula (4) and $R^2$ in Formula (5) are respectively as with $R^1$ in Formula (1) and $R^2$ in Formula (2). $R^c$ in Formulae (4) to (6) is, independently in each occurrence, selected from a hydrogen atom and a $C_1$-$C_4$ alkyl group, as with $R^c$ in Formula (II). Formula (4), (5), and (6) are expressed as follows:

[Chem. 21]

$$[R^1SiO(OR^c)] \quad (4)$$

[Chem. 22]

$$[R^2SiO(OR^c)] \quad (5)$$

[Chem. 23]

$$[HSiO(OR^c)] \quad (6)$$

In general, a silsesquioxane of complete cage structure is a polyorganosilsesquioxane that includes T3 unit(s) alone and is devoid of T2 units in the molecule. Specifically, assume that the polyorganosilsesquioxane according to the present invention, which has a T3 to T2 ratio of 5 or more and has a number-average molecular weight of 1000 to 3000 and a molecular-weight dispersity of 1.0 to 3.0, has one intrinsic absorption peak occurring at about 1100 cm$^{-1}$ in an FT-IR spectrum as mentioned below. This polyorganosilsesquioxane is indicated to have an incomplete cage silsesquioxane structure.

The presence of a cage (incomplete cage) silsesquioxane structure in the polyorganosilsesquioxane according to the present invention is verified by that the polyorganosilsesquioxane according to the present invention is approximately devoid of intrinsic absorption peaks at about 1050 cm$^{-1}$ and at about 1150 cm$^{-1}$, but offers one intrinsic absorption peak at about 1100 cm$^{-1}$ in an FT-IR spectrum (reference: R. H. Raney, M. Itoh, A. Sakakibara, and T. Suzuki, Chem. Rev. 95, 1409 (1995)). In contrast, a polyorganosilsesquioxane having intrinsic absorption peaks at about 1050 cm$^{-1}$ and at about 1150 cm$^{-1}$ in an FT-IR spectrum is generally identified as one having a ladder-like silsesquioxane structure. The FT-IR spectrum of the polyorganosilsesquioxane according to the present invention may be measured typically with an apparatus under conditions as follows.

Measuring apparatus: trade name FT-720 (supplied by HORIBA, Ltd.)
Measurement method: through transmission
Resolution: 4 cm$^{-1}$
Measurement wavenumber range: 400 to 4000 cm$^{-1}$
Number of scans: 16

The total proportion (total amount) of the constitutional unit represented by Formula (1) and the constitutional unit represented by Formula (4) is 55% to 100% by mole as described above, and is preferably 65% to 100% by mole, and furthermore preferably 80% to 99% by mole, based on the total amount (100% by mole) of siloxane constitutional units (all siloxane constitutional units; total amount of M units, D units, T units, and Q units) in the polyorganosilsesquioxane according to the present invention. The polyorganosilsesquioxane, as including the two constitutional units in a total proportion of 55% by mole or more, allows the curable composition to have better curability and allows the cured product to have significantly higher surface hardness and adhesiveness. The proportions of the individual siloxane constitutional units in the polyorganosilsesquioxane according to the present invention may be calculated typically based on the composition (formulation) of starting materials, and/or by NMR spectrometry.

The total proportion (total amount) of the constitutional unit represented by Formula (2) and the constitutional unit represented by Formula (5) is not limited, but is preferably 0% to 70% by mole, more preferably 0% to 60% by mole, furthermore preferably 0% to 40% by mole, and particularly preferably 1% to 15% by mole, based on the total amount (100% by mole) of siloxane constitutional units (all siloxane constitutional units; total amount of M units, D units, T units, and Q units) in the polyorganosilsesquioxane according to the present invention. The polyorganosilsesquioxane, when having a total proportion of the two constitutional units of 70% by mole or less, has a relatively larger total proportion of the constitutional unit represented by Formula (1) and constitutional unit represented by Formula (4). This tends to allow the curable composition to have better curability and tends to allow the cured product to have surface hardness and adhesiveness at still higher levels. In contrast, the polyorganosilsesquioxane, when having a total proportion of the two constitutional units of 1% by mole or more, tends to contribute to better gas barrier properties of the cured product.

The total proportion (total amount) of the constitutional unit represented by Formula (1), the constitutional unit represented by Formula (2), the constitutional unit represented by Formula (4), and the constitutional unit represented by Formula (5) is not limited, but is preferably 60% to 100% by mole, more preferably 70% to 100% by mole, and furthermore preferably 80% to 100% by mole, based on the total amount (100% by mole) of siloxane constitutional units (all siloxane constitutional units; total amount of M units, D units, T units, and Q units) in the polyorganosilsesquioxane according to the present invention. The polyorganosilsesquioxane, when having a total proportion of the constitutional units of 60% by mole or more, tends to allow the cured product to have surface hardness and adhesiveness at still higher levels.

The polyorganosilsesquioxane according to the present invention has a number-average molecular weight (Mn) of 1000 to 3000 as described above, and preferably 1000 to 2800, and more preferably 1100 to 2600, as determined by gel permeation chromatography and calibrated with a polystyrene standard. The polyorganosilsesquioxane, as having a number-average molecular weight of 1000 or more, allows the cured product to have heat resistance, scratch resistance, and adhesiveness at still higher levels. In contrast, the polyorganosilsesquioxane, as having a number-average molecular weight of 3000 or less, has better compatibility with other components in the curable composition, and this allows the cured product to have still better heat resistance.

The polyorganosilsesquioxane according to the present invention has a molecular-weight dispersity (Mw/Mn) of 1.0 to 3.0 as described above, and preferably 1.1 to 2.0, and more preferably 1.2 to 1.9, as determined by gel permeation chromatography and calibrated with a polystyrene standard. The polyorganosilsesquioxane, as having a molecular-weight dispersity of 3.0 or less, allows the cured product to have surface hardness and adhesiveness at still higher levels. In contrast, the polyorganosilsesquioxane, as having a molecular-weight dispersity of 1.1 or more, tends to be readily present as a liquid and to have better handleability.

The number-average molecular weight and the molecular-weight dispersity of the polyorganosilsesquioxane according to the present invention may be measured typically with an apparatus under conditions as follows.

Measuring apparatus: trade name LC-20AD (supplied by Shimadzu Corporation)
Columns: two Shodex KF-801 columns, one KF-802 column, and one KF-803 column (supplied by Showa Denko K.K.)

Measurement temperature: 40° C.

Eluent: THF, at a sample concentration of 0.1% to 0.2% by weight

Flow rate: 1 mL/min.

Detector: UV-VIS Detector (trade name SPD-20A, supplied by Shimadzu Corporation)

Molecular weight: calibrated with a polystyrene standard

The polyorganosilsesquioxane according to the present invention may have a 5% weight loss temperature ($T_{d5}$) not limited, but of preferably 330° C. or higher (e.g., 330° C. to 450° C.), more preferably 340° C. or higher, and furthermore preferably 350° C. or higher, in an air atmosphere. The polyorganosilsesquioxane, when having a 5% weight loss temperature of 330° C. or higher, tends to allow the cured product to have still better heat resistance. In particular, the 5% weight loss temperature of the polyorganosilsesquioxane according to the present invention may be controlled to 330° C. or higher as the polyorganosilsesquioxane has a T3 to T2 ratio of 5 or more, has a number-average molecular weight of 1000 to 3000 and a molecular-weight dispersity of 1.0 to 3.0, and offers one intrinsic peak at about 1100 cm$^{-1}$ in the FT-IR spectrum. The 5% weight loss temperature refers to a temperature at which a sample heated at a constant rate of temperature rise loses 5% of its weight as compared with one before heating. The 5% weight loss temperature serves as an index for heat resistance. The 5% weight loss temperature may be measured by thermogravimetry (TGA) in an air atmosphere at a rate of temperature rise of 5° C./min.

The polyorganosilsesquioxane according to the present invention is producible by any of known or common polysiloxane production methods without limitation, but may be produced typically by subjecting one or more hydrolyzable silane compounds to hydrolysis and condensation. However, the hydrolyzable silane compound(s) essentially includes a hydrolyzable trifunctional silane compound (compound represented by Formula (a)) to form the above-mentioned constitutional unit represented by Formula (1).

More specifically, for example, the polyorganosilsesquioxane according to the present invention may be produced by subjecting the compound represented by Formula (a), and, as needed, a compound represented by Formula (b) and/or a compound represented by Formula (c) to hydrolysis and condensation. The compound represented by Formula (a), (b) or (c) is a hydrolyzable silane compound to form the silsesquioxane constitutional unit (T unit) in the polyorganosilsesquioxane according to the present invention. Formulae (a), (b), and (c) are expressed as follows:

[Chem. 24]

(a)

[Chem. 25]

(b)

[Chem. 26]

(c)

The compound represented by Formula (a) is a compound that forms the constitutional unit represented by Formula (1) in the polyorganosilsesquioxane according to the present invention. $R^1$ in Formula (a) represents an epoxy-containing group, as with $R^1$ in Formula (1). Specifically, $R^1$ in Formula (a) is preferably selected from the groups represented by Formula (1a), the groups represented by Formula (1b), the groups represented by Formula (1c), and the groups represented by Formula (1d); more preferably selected from the groups represented by Formula (1a) and the groups represented by Formula (1c); furthermore preferably selected from the groups represented by Formula (1a); particularly preferably selected from the groups represented by Formula (1a) in which Ria is an ethylene group; and is especially preferably 2-(3',4'-epoxycyclohexyl)ethyl group.

$X^1$ in Formula (a) is, independently in each occurrence, selected from an alkoxy group and a halogen atom. Non-limiting examples of the alkoxy group as $X^1$ include $C_1$-$C_4$ alkoxy groups such as methoxy, ethoxy, propoxy, isopropyloxy, butoxy, and isobutyloxy groups. Non-limiting examples of the halogen atom as $X^1$ include fluorine, chlorine, bromine, and iodine atoms. In particular, $X^1$ is, independently in each occurrence, preferably selected from alkoxy groups and is more preferably selected from methoxy and ethoxy groups. The three occurrences of $X^1$ may be identical to or different from one another The compound represented by Formula (b) is a compound that forms the constitutional unit represented by Formula (2) in the polyorganosilsesquioxane according to the present invention. $R^2$ in Formula (b) is selected from a substituted or unsubstituted aryl group, a substituted or unsubstituted aralkyl group, a substituted or unsubstituted cycloalkyl group, a substituted or unsubstituted alkyl group, and a substituted or unsubstituted alkenyl group, as with $R^2$ in Formula (2). Specifically, $R^2$ in Formula (b) is, independently in each occurrence, preferably selected from substituted or unsubstituted aryl groups, substituted or unsubstituted alkyl groups, and substituted or unsubstituted alkenyl groups; is more preferably selected from substituted or unsubstituted aryl groups; and is furthermore preferably phenyl group.

$X^2$ in Formula (b) is selected from an alkoxy group and a halogen atom. Non-limiting examples of $X^2$ include those exemplified as $X^1$. In particular, $X^2$ is, independently in each occurrence, preferably selected from alkoxy groups and is more preferably selected from methoxy and ethoxy groups. The three occurrences of $X^2$ may be identical to or different from one another The compound represented by Formula (c) is a compound that forms the constitutional unit represented by Formula (3) in the polyorganosilsesquioxane according to the present invention. $X^3$ in Formula (c) is selected from an alkoxy group and a halogen atom. Non-limiting examples of $X^3$ include those exemplified as $X^1$. In particular, $X^3$ is, independently in each occurrence, preferably selected from alkoxy groups and is more preferably selected from methoxy and ethoxy groups. The three occurrences of $X^3$ may be identical to or different from one another The hydrolyzable silane compounds for use herein may further include one or more hydrolyzable silane compounds other than the compounds represented by Formulae (a) to (c). Non-limiting examples of the other hydrolyzable silane compounds include hydrolyzable trifunctional silane compounds excluding the compounds represented by Formula (a) to (c); hydrolyzable monofunctional silane compounds, which form M units; hydrolyzable bifunctional silane compounds, which form D units; and hydrolyzable tetrafunctional silane compounds, which form Q units.

The amount and formulation of hydrolyzable silane compound(s) to be used may be adjusted as appropriate according to a desired structure of the polyorganosilsesquioxane according to the present invention. For example, the amount of the compound represented by Formula (a) is not limited, but is preferably 55% to 100% by mole, more preferably 65% to 100% by mole, and furthermore preferably 80% to 99% by mole, based on the total amount (100% by mole) of the hydrolyzable silane compound(s) to be used.

The amount of the compound represented by Formula (b) is not limited, but is preferably 0% to 70% by mole, more preferably 0% to 60% by mole, furthermore preferably 0% to 40% by mole, and particularly preferably 1% to 15% by mole, based on the total amount (100% by mole) of hydrolyzable silane compound(s) to be used.

The total proportion of the compound represented by Formula (a) and the compound represented by Formula (b) is not limited, but is preferably 60% to 100% by mole, more preferably 70% to 100% by mole, and furthermore preferably 80% to 100% by mole, based on the total amount (100% by mole) of the hydrolyzable silane compound(s) to be used.

Assume that the hydrolyzable silane compound(s) to be used includes two or more different compounds. In this case, the hydrolysis and condensation reactions of these hydrolyzable silane compounds may be performed simultaneously or successively. The reactions, when performed successively, may be performed in any order.

The hydrolysis and condensation reaction(s) of the hydrolyzable silane compound(s) may be performed in the presence of, or in the absence of, a solvent. In particular, the reaction(s) is preferably performed in the presence of a solvent. Examples of the solvent include, but are not limited to, aromatic hydrocarbons such as benzene, toluene, xylenes, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. Among them, the solvent is preferably selected from ketones and ethers. Each of different solvents may be used alone or in combination.

The amount of the solvent is not limited, and may be adjusted as appropriate according typically to a desired reaction time, within the range of 0 to 2000 parts by weight per 100 parts by weight of the total amount of the hydrolyzable silane compound(s).

The hydrolysis and condensation reaction(s) of the hydrolyzable silane compound(s) is preferably performed in the presence of a catalyst and water. The catalyst may be either an acid catalyst or an alkaline catalyst. Non-limiting examples of the acid catalyst include mineral acids such as hydrochloric acid, sulfuric acid, nitric acid, phosphoric acid, and boric acid; phosphoric esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Non-limiting examples of the alkaline catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts (e.g., acetates), such as lithium acetate, sodium acetate, potassium acetate, and cesium acetate; alkaline earth metal organic acid salts (e.g., acetates), such as magnesium acetate; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines such as triethylamine, N-methylpiperidine, 1,8-diazabicyclo[5.4.0]undec-7-ene, and 1,5-diazabicyclo[4.3.0]non-5-ene, of which tertiary amines are typified; and nitrogen-containing heteroaromatic compounds such as pyridine, 2,2'-bipyridyl, and 1,10-phenanthroline. Each of different catalysts may be used alone or in combination. The catalyst may be used in the form of a solution or dispersion typically in water or a solvent.

The amount of the catalyst is not limited and may be adjusted as appropriate within the range of 0.002 to 0.200 mole per mole of all the hydrolyzable silane compound(s).

The amount of water in the hydrolysis and condensation reaction is not limited and may be adjusted as appropriate within the range of 0.5 to 20 mol per mole of all the hydrolyzable silane compound(s).

The water may be added in any manner not limited. The water may be added at once as a whole quantity (total amount to be used), or may be added successively. The water, when added successively, may be added continuously or intermittently.

It is important that the hydrolysis and condensation reaction of the hydrolyzable silane compound(s) is performed, in particular, under such reaction conditions that the resulting polyorganosilsesquioxane according to the present invention has a T3 to T2 ratio of 5 or more. The hydrolysis and condensation reaction may be performed at a reaction temperature not limited, but of preferably 40° C. to 100° C., and more preferably 45° C. to 80° C. The reaction, when performed at a reaction temperature controlled within the range, tends to more efficiently allow the polyorganosilsesquioxane to have a T3 to T2 ratio of 5 or more. The hydrolysis and condensation reaction may be performed for a reaction time not limited, but of preferably 0.1 to 10 hours, and more preferably 1.5 to 8 hours. The hydrolysis and condensation reaction may be performed under normal atmospheric pressure, under pressure (under a load) or under reduced pressure. The atmosphere in which the hydrolysis and condensation reaction is performed is not limited and may be any of an atmosphere of an inert gas, such as nitrogen atmosphere or argon atmosphere; and an atmosphere in the presence of oxygen, such as air atmosphere. The reaction is, however, preferably performed in an atmosphere of an inert gas.

The hydrolysis and condensation reaction of the hydrolyzable silane compound(s) yields the polyorganosilsesquioxane according to the present invention. After the completion of the hydrolysis and condensation reaction, the catalyst is preferably neutralized so as to restrain epoxy group ring-opening. The polyorganosilsesquioxane according to the present invention may be separated/purified typically by a separation means such as water washing, acid washing, alkali washing, filtration, concentration, distillation, extraction, crystallization, recrystallization, or column chromatography, or a separation means as any combination of them.

The polyorganosilsesquioxane according to the present invention has the configuration. Assume that the polyorganosilsesquioxane is incorporated as an essential component into a curable composition. The resulting curable composition forms, when cured, a cured product that offers high surface hardness and good heat resistance, is highly flexible, and has excellent processability. The curable composition also forms a cured product that has excellent adhesiveness.

Curable Composition

The curable composition according to the present invention is a curable composition (curable resin composition) that contains the polyorganosilsesquioxane according to the present invention as an essential component. As will be described later, the curable composition according to the present invention may further contain one or more components such as a curing catalyst (in particular, a cationic photoinitiator), a surface control agent, and a surface modifier.

The curable composition according to the present invention may contain each of different polyorganosilsesquioxanes according to the present invention alone or in combination.

The curable composition according to the present invention may contain the polyorganosilsesquioxane(s) according to the present invention in a content (blending amount) not limited, but of preferably from 70% by weight to less than 100% by weight, more preferably 80% to 99.8% by weight, and furthermore preferably 90% to 99.5% by weight, based on the total amount (100% by weight) of the curable composition excluding the solvent. The curable composition, when containing the polyorganosilsesquioxane(s) according to the present invention in a content of 70% by weight or more, tends to allow the cured product to have surface hardness and adhesiveness at still higher levels. In contrast, the curable composition, when containing the polyorganosilsesquioxane(s) according to the present invention in a content of less than 100% by weight, can contain a curing catalyst. This tends to more efficiently promote the curing of the curable composition.

The curable composition according to the present invention may contain the polyorganosilsesquioxane(s) according to the present invention in a proportion not limited, but of preferably 70% to 100% by weight, more preferably 75% to 98% by weight, and furthermore preferably 80% to 95% by weight, based on the total amount (100% by weight) of all cationically curable compounds contained in the curable composition. The curable composition, when containing the polyorganosilsesquioxane(s) according to the present invention in a content of 70% by weight or more, tends to allow the cured product to have surface hardness and adhesiveness at still higher levels.

The curable composition according to the present invention preferably further contains a curing catalyst. Among such curing catalysts, the curable composition particularly preferably contains a cationic photoinitiator as the curing catalyst. This is preferred for a shorter curing time for the cured product to become tack-free.

The curing catalyst is a compound that initiates and/or promotes a cationic polymerization reaction of cationically curable compounds such as the polyorganosilsesquioxanes according to the present invention. Non-limiting examples of the curing catalyst include polymerization initiators such as cationic photoinitiators (a photoacid generators) and cationic thermal initiators (thermal acid generators).

The cationic photoinitiators may be selected from known or common cationic photoinitiators and are exemplified by, but are not limited to, sulfonium salts (salts between a sulfonium ion and an anion), iodonium salts (salts between an iodonium ion and an anion), selenium salts (salts between a selenium ion and an anion), ammonium salts (salts between an ammonium ion and an anion), phosphonium salts (salts between a phosphonium ion and an anion), and salts between a transition metal complex ion and an anion. The curable composition may contain each of different cationic photoinitiators alone or in combination.

Examples of the sulfonium salts include, but are not limited to, triarylsulfonium salts such as the trade name HS-1PC (supplied by San-Apro Ltd.), the trade name LW-S1 (supplied by San-Apro Ltd.), triphenylsulfonium salts, tri-p-tolylsulfonium salts, tri-o-tolylsulfonium salts, tris(4-methoxyphenyl)sulfonium salts, 1-naphthyl(diphenyl)sulfonium salts, 2-naphthyl(diphenyl)sulfonium salts, tris(4-fluorophenyl)sulfonium salts, tri-1-naphthylsulfonium salts, tri-2-naphthylsulfonium salts, tris(4-hydroxyphenyl)sulfonium salts, diphenyl[4-(phenylthio)phenyl]sulfonium salts, and 4-(p-tolylthio)phenyl(di-(p-phenyl))sulfonium salts; diarylsulfonium salts such as diphenyl(phenacyl)sulfonium salts, diphenyl(4-nitrophenacyl)sulfonium salts, diphenyl(benzyl)sulfonium salts, and diphenyl(methyl)sulfonium salts; monoarylsulfonium salts such as phenyl(methyl)benzylsulfonium salts, 4-hydroxyphenyl(methyl)benzylsulfonium salts, and 4-methoxyphenyl(methyl)benzylsulfonium salts; and trialkylsulfonium salts such as dimethyl(phenacyl)sulfonium salts, phenacyltetrahydrothiophenium salts, and dimethyl(benzyl)sulfonium salts.

Non-limiting examples of the diphenyl[4-(phenylthio)phenyl]sulfonium salts include commercial products available typically under the trade name CPI-101A (supplied by San-Apro Ltd., diphenyl[4-(phenylthio)phenyl]sulfonium hexafluoroantimonate, as a 50% propylene carbonate solution), and the trade name CPI-100P (supplied by San-Apro Ltd., diphenyl[4-(phenylthio)phenyl]sulfonium hexafluorophosphate, as a 50% propylene carbonate solution). Non-limiting examples of the triarylsulfonium salts also include commercial products typically under the trade name K1-S (supplied by San-Apro Ltd., an antimony-free (non-antimony) triarylsulfonium salt).

Non-limiting examples of the iodonium salts include the trade name UV9380C (supplied by Momentive Performance Materials Japan LLC, bis(4-dodecylphenyl)iodonium hexafluoroantimonate, as a 45% alkyl glycidyl ether solution), the trade name RHODORSIL PHOTOINITIATOR 2074 (supplied by Rhodia Japan, Ltd., [(1-methylethyl)phenyl](methylphenyl)iodonium tetrakis(pentafluorophenyl)borate), the trade name WPI-124 (supplied by Wako Pure Chemical Industries, Ltd.), diphenyliodonium salts, di-p-tolyliodonium salts, bis(4-dodecylphenyl)iodonium salts, and bis(4-methoxyphenyl)iodonium salts.

Examples of the selenium salts include, but are not limited to, triarylselenium salts such as triphenylselenium salts, tri-p-tolylselenium salts, tri-o-tolylselenium salts, tris(4-methoxyphenyl)selenium salts, and 1-naphthyl(diphenyl)selenium salts; diarylselenium salts such as diphenyl(phenacyl)selenium salts, diphenyl(benzyl)selenium salts, and diphenyl(methyl)selenium salts; monoarylselenium salts such as phenyl(methyl)benzylselenium salts; and trialkylselenium salts such as dimethyl(phenacyl)selenium salts.

Examples of the ammonium salts include, but are not limited to, tetraalkylammonium salts such as tetramethylammonium salts, ethyl(trimethyl)ammonium salts, diethyl(dimethyl)ammonium salts, triethyl(methyl)ammonium salts, tetraethylammonium salts, trimethyl(n-propyl)ammonium salts, and trimethyl(n-butyl)ammonium salts; pyrrolidium salts such as N,N-dimethylpyrrolidium salts and N-ethyl-N-methylpyrrolidium salts; imidazolinium salts such as N,N'-dimethylimidazolinium salts and N,N'-diethylimidazolinium salts; tetrahydropyrimidium salts such as N,N'-dimethyltetrahydropyrimidium salts and N,N'-diethyltetrahydropyrimidium salts; morpholinium salts such as N,N-dimethylmorpholinium salts and N,N-diethylmorpholinium salts; piperidinium salts such as N,N-dimethylpiperidinium salts and N,N-diethylpiperidinium salts; pyridinium salts such as N-methylpyridinium salts and N-ethylpyridinium salts; imidazolium salts such as N,N'-dimethylimidazolium salts; quinolium salts such as N-methylquinolium salts; isoquinolium salts such as N-methylisoquinolium salts; thiazonium salts such as benzylbenzothiazonium salts; and acridium salts such as benzylacridium salts.

Non-limiting examples of the phosphonium salts include tetraarylphosphonium salts such as tetraphenylphosphonium salts, tetra-p-tolylphosphonium salts, and tetrakis(2-methoxyphenyl)phosphonium salts; triarylphosphonium salts such as triphenyl(benzyl)phosphonium salts; and tetraalkylphosphonium salts such as triethyl(benzyl)phosphonium salts, tributyl(benzyl)phosphonium salts, tetraethylphosphonium salts, tetrabutylphosphonium salts, and triethyl(phenacyl)phosphonium salts.

Non-limiting examples of the transition metal complex ion salts include salts of chromium complex cations such as (η5-cyclopentadienyl) (η6-toluene)Cr$^+$ and (η5-cyclopentadienyl) (η6-xylene)Cr$^+$; and salts of iron complex cations such as (η5-cyclopentadienyl) (η6-toluene)Fe$^+$ and (η5-cyclopentadienyl) (η6-xylene) Fe$^+$.

Non-limiting examples of the anions constituting the salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, sulfonate anions (e.g., trifluoromethanesulfonate anion, pentafluoroethanesulfonate anion, nonafluorobutanesulfonate anion, methanesulfonate anion, benzenesulfonate anion, and p-toluenesulfonate anion), $(CF_3SO_2)_3C^-$, $(CF_3SO_2)_2N^-$, perhalogenate ions, halogenated sulfonate ions, sulfate ions, carbonate ion, aluminate ions, hexafluorobismuthate ions, carboxylate ions, arylborate ions, thiocyanate ions, and nitrate ions.

Examples of the cationic thermal initiators include, but are not limited to, arylsulfonium salts, aryliodonium salts, allene-ion complexes, quaternary ammonium salts, aluminum chelates, and boron trifluoride-amine complexes.

Non-limiting examples of the arylsulfonium salts include hexafluoroantimonate salts. The curable composition according to the present invention may employ any of commercial products typically under the trade names SP-66 and SP-77 (each supplied by ADEKA CORPORATION); and the trade names San-Aid SI-60L, San-Aid SI-80L, San-Aid SI-100L, and San-Aid SI-150L (each supplied by SANSHIN CHEMICAL INDUSTRY CO., LTD.). Non-limiting examples of the aluminum chelates include, but are not limited to, aluminum ethyl acetoacetate diisopropylate and aluminum tris(ethyl acetoacetate). Examples of the boron trifluoride amine complexes include, but are not limited to, boron trifluoride monoethylamine complex, boron trifluoride imidazole complex, and boron trifluoride piperidine complex.

The curable composition according to the present invention may contain each of different curing catalysts alone or in combination.

The curable composition according to the present invention may contain the curing catalyst in a content (blending amount) not limited, but of preferably 0.01 to 3.0 parts by weight, more preferably 0.05 to 3.0 parts by weight, and furthermore preferably 0.1 to 1.0 part by weight (e.g., 0.3 to 1.0 part by weight), per 100 parts by weight of the polyorganosilsesquioxane according to the present invention. The curable composition, when containing the curing catalyst in a content of 0.01 part by weight or more, tends to undergo an efficiently sufficiently proceeding curing reaction and to allow the cured product to have surface hardness and adhesiveness at still higher levels. In contrast, the curable composition, when containing the curing catalyst in a content of 3.0 parts by weight or less, tends to have still better storage stability and/or to allow the cured product to resist coloring.

The curable composition according to the present invention may further contain one or more other cationically curable compounds. The "other cationically curable compounds" refer to cationically curable compounds excluding the polyorganosilsesquioxanes according to the present invention. The other cationically curable compounds may be selected from known or common cationically curable compounds and are exemplified by, but are not limited to, other epoxides, oxetane compounds, and vinyl ether compounds, where the "other epoxides" refer to epoxides excluding the polyorganosilsesquioxanes according to the present invention. The curable composition according to the present invention may contain each of different other cationically curable compounds alone or in combination.

The other epoxides may be selected from known or common compounds containing at least one epoxy group (oxirane ring) per molecule and are exemplified by, but are not limited to, cycloaliphatic epoxides (cycloaliphatic epoxy resins), aromatic epoxides (aromatic epoxy resins), and aliphatic epoxides (aliphatic epoxy resins).

The cycloaliphatic epoxides may be selected from known or common compounds containing at least one alicycle and at least one epoxy group per molecule and are exemplified by, but are not limited to, (1) compounds containing at least one cycloaliphatic epoxy group per molecule, where the "cycloaliphatic epoxy group" refers to an epoxy group containing one oxygen atom bonded in triangular arrangement to adjacent two carbon atoms constituting an alicycle; (2) compounds containing at least one epoxy group bonded directly via a single bond to an alicycle; and (3) glycidyl ether epoxides that are compounds containing at least one alicycle and at least one glycidyl ether group per molecule.

Non-limiting examples of the compounds (1) containing at least one cycloaliphatic epoxy group per molecule include compounds represented by Formula (i):

[Chem. 27]

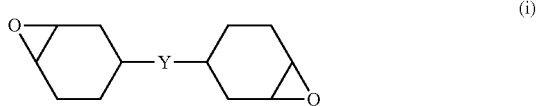

(i)

In Formula (i), Y is selected from a single bond and a linkage group, where the "linkage group" refers to a divalent group containing at least one atom. Examples of the linkage group include, but are not limited to, divalent hydrocarbon groups; alkenylene groups, except with part or all of carbon-carbon double bond(s) being epoxidized; carbonyl group; ether bond; ester bond; carbonate group; amide group; and groups each including two or more of these groups bonded to each other.

Non-limiting examples of the divalent hydrocarbon groups include $C_1$-$C_{18}$ straight or branched chain alkylene groups and divalent alicyclic hydrocarbon groups. Examples of the $C_1$-$C_{18}$ straight or branched chain alkylene groups include, but are not limited to, methylene, methylmethylene, dimethylmethylene, ethylene, propylene, and trimethylene groups. Examples of the divalent alicyclic hydrocarbon groups include, but are not limited to, divalent cycloalkylene groups (including cycloalkylidene groups) such as 1,2-cyclopentylene, 1,3-cyclopentylene, cyclopentylidene, 1,2-cyclohexylene, 1,3-cyclohexylene, 1,4-cyclohexylene, and cyclohexylidene groups.

The alkenylene groups with part or all of carbon-carbon double bond(s) being epoxidized are hereinafter also referred to as "epoxidized alkenylene groups". Non-limiting examples of the alkenylene groups in the epoxidized alkenylene groups include $C_2$-$C_8$ straight or branched chain alkenylene groups such as vinylene, propenylene, 1-butenylene, 2-butenylene, butadienylene, pentenylene, hexenylene, heptenylene, and octenylene groups. In particular, of the epoxidized alkenylene groups, preferred are alkenylene groups with all of carbon-carbon double bond(s) being epoxidized, and more preferred are $C_2$-$C_4$ alkenylene groups with all of carbon-carbon double bond(s) being epoxidized.

Representative, but non-limiting examples of the cycloaliphatic epoxides represented by Formula (i) include 3,4,3',4'-diepoxybicyclohexane; and compounds represented by Formulae (i-1) to (i-10). In Formulae (i-5) and (i-7), 1 and m each independently represent an integer of 1 to 30. R' in Formula (i-5) represents, independently in each occurrence, a $C_1$-$C_8$ alkylene group and is preferably a $C_1$-$C_3$ straight or branched chain alkylene group such as methylene, ethylene, propylene, or isopropylene group. In Formulae (i-9) and (i-10), n1 to n6 each independently represent an integer of 1 to 30. Non-limiting examples of the cycloaliphatic epoxides represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl) ether.

[Chem. 28]

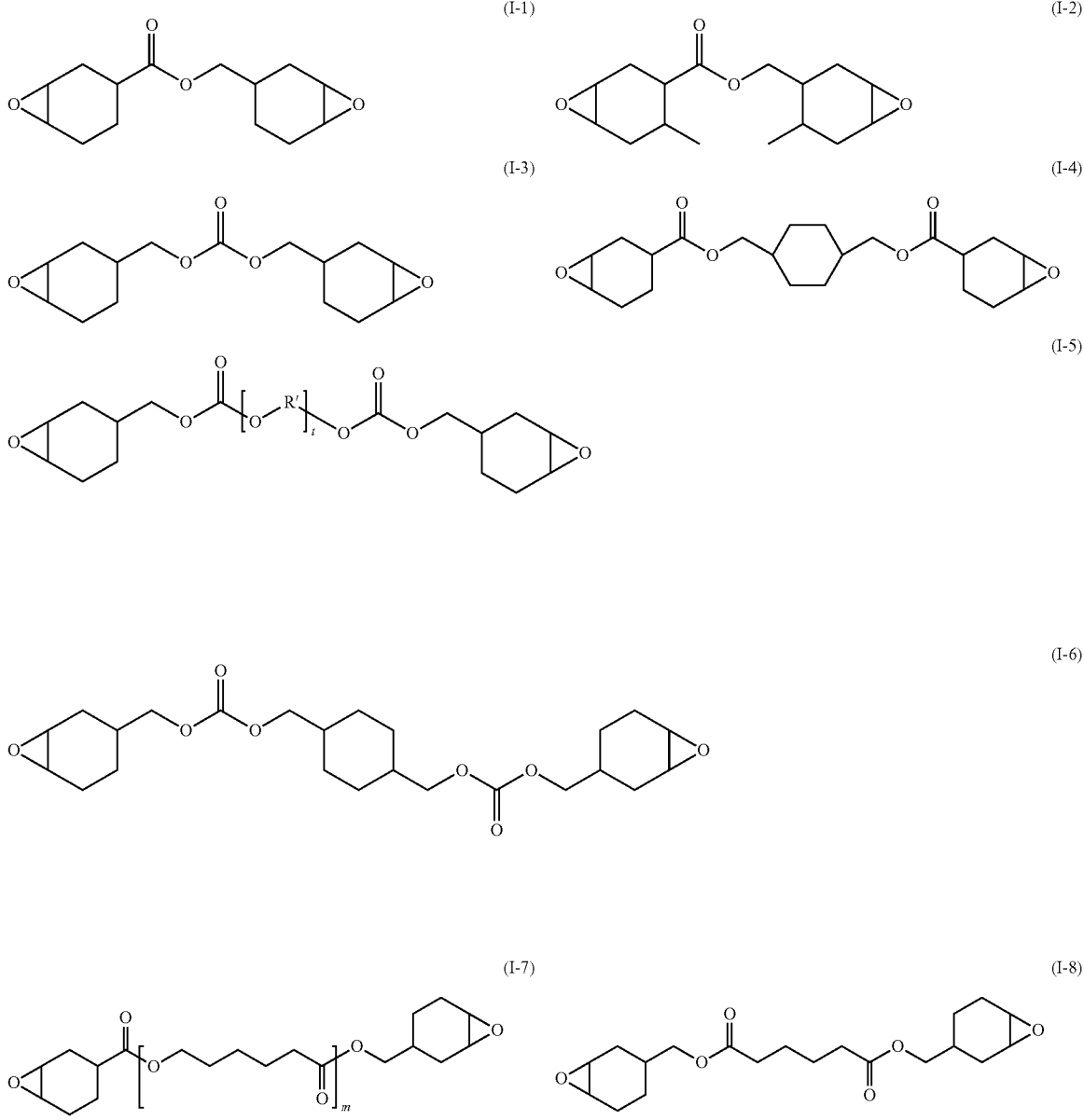

[Chem. 29]

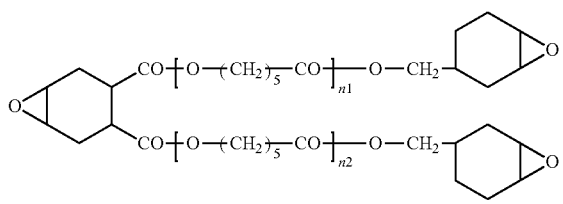
(I-9)

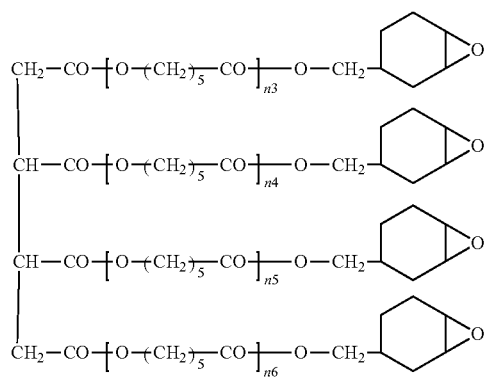
(I-10)

Non-limiting examples of the compounds (2) containing an epoxy group directly bonded via a single bond to an alicycle include compounds represented by Formula (ii):

[Chem. 30]

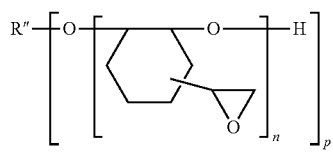
(ii)

In Formula (ii), R" represents a group (p-valent organic group) corresponding to a p-hydric alcohol, except for removing hydroxy group (—OH) in the number of p from the structural formula of the alcohol; and p and n each independently represent a natural number. Non-limiting examples of the p-hydric alcohol ($R''(OH)_p$) include polyhydric alcohols such as 2,2-bis(hydroxymethyl)-1-butanol, of which $C_1$-$C_{15}$ alcohols are typified. The number p is preferably 1 to 6, and n is preferably 1 to 30. When p is 2 or more, the occurrences of n for the groups present in the respective brackets (outer brackets) may be identical or different. Examples of the compounds represented by Formula (ii) include, but are not limited to, a 1,2-epoxy-4-(2-oxiranyl)cyclohexane adduct of 2,2-bis(hydroxymethyl)-1-butanol, such as a product under the trade name EHPE3150 (supplied by Daicel Corporation).

Non-limiting examples of the compounds (3) containing at least one alicycle and at least one glycidyl ether group per molecule include glycidyl ethers of alicyclic alcohols (in particular, of alicyclic polyhydric alcohols). More specifically, non-limiting examples of the compound (3) include hydrogenated bisphenol-A epoxides such as 2,2-bis[4-(2,3-epoxypropoxy)cyclohexyl]propane and 2,2-bis[3,5-dimethyl-4-(2,3-epoxypropoxy)cyclohexyl]propane, where the hydrogenated bisphenol-A epoxides are compounds derived from bisphenol-A epoxides via hydrogenation; hydrogenated bisphenol-F epoxides such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane, where the hydrogenated bisphenol-F epoxides are compounds derived from bisphenol-F epoxides via hydrogenation; hydrogenated biphenol epoxides; hydrogenated phenol novolac epoxides; hydrogenated cresol novolac epoxides; hydrogenated cresol novolac epoxides derived from bisphenol-A; hydrogenated naphthalene epoxides; hydrogenated products of epoxides derived from trisphenolmethane; and hydrogenated epoxides derived from after-mentioned aromatic epoxides.

Examples of the aromatic epoxides include, but are not limited to, epi-bis glycidyl ether epoxy resins; high-molecular-weight epi-bis glycidyl ether epoxy resins; novolac-alkyl glycidyl ether epoxy resins; and fluorene-derived epoxides. The epi-bis glycidyl ether epoxy resins are each obtained by a condensation reaction between a bisphenol and epihalohydrin. Non-limiting examples of the bisphenol include bisphenol-A, bisphenol-F, bisphenol-S, and fluorene-bisphenol. The high-molecular-weight epi-bis glycidyl ether epoxy resins are obtained by further subjecting the epi-bis glycidyl ether epoxy resins to an addition reaction with the bisphenol. The novolac-alkyl glycidyl ether epoxy resins are each obtained by subjecting a phenol and an aldehyde to a condensation reaction to give a polyhydric alcohol, and further subjecting the polyhydric alcohol to a condensation reaction with epihalohydrin. Non-limiting examples of the phenol include phenol, cresol, xylenol, resorcinol, catechol, bisphenol-A, bisphenol-F, and bisphenol-S. Non-limiting examples of the aldehyde include formaldehyde, acetaldehyde, benzaldehyde, hydroxybenzaldehyde, and salicylaldehyde. The fluorene-derived epoxides each include a fluorene ring, and two phenol skeletons bonded to the 9-position of the fluorene ring, in which the hydroxy groups of these phenol skeleton lose hydrogen atoms to expose oxygen atoms, and glycidyl groups are respectively bonded directly or via an alkyleneoxy group to the oxygen atoms.

Examples of the aliphatic epoxides include, but are not limited to, glycidyl ethers of q-hydric alcohols devoid of cyclic structures, where q represents a natural number; glycidyl esters of monovalent or polyvalent carboxylic acids such as acetic acid, propionic acid, butyric acid, stearic acid, adipic acid, sebacic acid, maleic acid, and itaconic acid; epoxidized derivatives of double-bond-containing fats and oils, such as epoxidized linseed oil, epoxidized soybean oil, and epoxidized castor oil; and epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, poly(ethylene glycol)s, and poly(propylene glycol)s; and tri- or higher polyhydric alcohols such as glycerol, diglycerol, erythritol, trimethylolethane, trimethylolpropane, pentaerythritol, dipentaerythritol, and sorbitol. Examples of the q-hydric alcohols also include polyether polyols, polyester polyols, polycarbonate polyols, and polyolefin polyols.

The oxetane compounds may be selected from, but are not limited to, known or common compounds containing at least one oxetane ring per molecule, such as 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl} ether, 4,4'-bis[(3-ethyl-3-oxetanyl)methoxymethyl]bicyclohexyl, 1,4-bis[(3-ethyl-3-oxetanyl)methoxymethyl]cyclohexane, 1,4-bis{[(3-ethyl-3-oxetanyl)methoxy]methyl}benzene, 3-ethyl-3-{[(3-ethyloxetan-3-yl)methoxy]methyl)}oxetane, xylylene bisoxetane, 3-ethyl-3-{[3-(triethoxysilyl)propoxy]methyl}oxetane, oxetanylsilsesquioxane, and phenol novolac oxetanes.

The vinyl ether compounds may be selected from known or common compounds containing at least one vinyl ether group per molecule and are exemplified by, but are not limited to, 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ethers, oligoethylene glycol divinyl ethers, poly(ethylene glycol) monovinyl ethers, poly(ethylene glycol) divinyl ethers, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropylene glycol monovinyl ethers, oligopropylene glycol divinyl ethers, poly(propylene glycol) monovinyl ethers, poly(propylene glycol) divinyl ethers, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol-A divinyl ether, bisphenol-F divinyl ether, hydroxyoxanorbornanemethanol divinyl ether, 1,4-cyclohexanediol divinyl ether, pentaerythritol trivinyl ether, pentaerythritol tetravinyl ether, dipentaerythritol pentavinyl ether, and dipentaerythritol hexavinyl ether.

In a preferred embodiment, the curable composition according to the present invention further contains a vinyl ether compound as the other cationically curable compound, in addition to the polyorganosilsesquioxane according to the present invention. This configuration tends to contribute to still higher surface hardness of the cured product. Assume that the curable composition according to this embodiment of the present invention is cured by irradiation with an active energy ray (in particular, an ultraviolet ray). In particular in this case, the curable composition advantageously forms a cured product that has very high surface hardness with excellent productivity, even being irradiated with the active energy ray at a low irradiance. For example, this cured product may be produced without the need for a heat treatment for aging. This allows the cured product and the hard coat film to be produced at a higher speed in a production line and contributes to still better productivity of them.

In an embodiment, the curable composition contains, as the other cationically curable compound, a vinyl ether compound containing at least one hydroxy group per molecule. Advantageously, the curable composition according to this embodiment gives a cured product that has still higher surface hardness and offers excellent resistance to thermal yellowing, where the resistance to thermal yellowing is such a property as to resist thermal yellowing. This curable composition allows the cured product and the hard coat film to have quality and durability at still higher levels. The number of hydroxy groups per molecule of the vinyl ether compound containing at least one hydroxy group per molecule is not limited, but is preferably 1 to 4, and more preferably 1 or 2. Specifically, non-limiting examples of the vinyl ether compound containing at least one hydroxy group per molecule include 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,8-octanediol divinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ethers, poly(ethylene glycol) monovinyl ethers, tripropylene glycol monovinyl ether, tetrapropylene glycol monovinyl ether, pentapropylene glycol monovinyl ether, oligopropylene glycol monovinyl ethers, poly(propylene glycol) monovinyl ethers, pentaerythritol trivinyl ether, and dipentaerythritol pentavinyl ether.

The curable composition according to the present invention may contain the other cationically curable compounds in a content (blending amount) not limited, but of preferably 50% by weight or less (e.g., 0% to 50% by weight), more preferably 30% by weight or less (e.g., 0% to 30% by weight), and furthermore preferably 10% by weight or less, relative to the total amount (100% by weight) of the polyorganosilsesquioxanes according to the present invention and the other cationically curable compounds (total amount of cationically curable compounds). The curable composition, when containing the other cationically curable compounds in a content of 50% by weight or less (in particular, 10% by weight or less), tends to allow the cured product to have still better scratch resistance. In contrast, the other cationically curable compounds, when contained in a content of 10% by weight or more, may impart desired properties to the curable composition and/or to the cured product. Such desired properties are exemplified by fast curability and adjusted viscosity of the curable composition.

The curable composition according to the present invention may contain the vinyl ether compound (in particular, the vinyl ether compound containing at least one hydroxy group per molecule) in a content (blending amount) not limited, but of preferably 0.01% to 10% by weight, more preferably 0.05% to 9% by weight, and furthermore preferably 1% to 8% by weight, relative to the total amount (100% by weight) of the polyorganosilsesquioxanes according to the present invention and the other cationically curable compounds (total amount of cationically curable compounds). The curable composition, when containing the vinyl ether compound in a content controlled within the range, tends to allow the cured product to have still higher surface hardness and to have very high surface hardness even when irradiated with an active energy ray (e.g., an ultraviolet ray) at a low irradiance. In particular, the curable composition, when containing the vinyl ether compound containing at least one hydroxy group per molecule in a content controlled within the range, tends to allow the cured product to have particularly higher surface hardness and still better resistance to thermal yellowing.

The curable composition according to the present invention may further contain one or more commonly used additives as other optional components. Non-limiting examples of the additives include fillers including inorganic fillers such as precipitated silica, hydrous silica (wet silica), fumed silica, pyrogenic silica, titanium oxide, alumina, glass, quartz, aluminosilicate, iron oxides, zinc oxide, calcium carbonate, carbon black, silicon carbide, silicon nitride, and boron nitride; inorganic fillers corresponding to these fillers, except for being treated with any of organosilicon compounds such as organohalosilanes, organoalkoxysilanes, and organosilazanes; fine powders of organic resins such as silicone resins, epoxy resins, and fluorocarbon resins; and conductive powders of metals such as silver and copper. Non-limiting examples of the additives further include curing assistants; solvents such as organic solvents; stabilizers such as antioxidants, ultraviolet absorbers, photostabilizers, thermal stabilizers, and heavy-metal deactivators; flame retardants such as phosphorus flame retardants, halogen flame retardants, and inorganic flame retardants; flame retardant promoters; reinforcing agents such as other fillers; nucleating agents; coupling agents such as silane coupling agents; lubricants; waxes; plasticizers; release agents; impact modifiers; color modifiers (hue modifiers); clearing agents; rheology adjusters such as flow improvers; processability improvers; colorants such as dyestuffs and pigments; antistatic agents; dispersing agents; surface control agents such as antifoaming agents, leveling agents, and anti-popping agents; surface modifiers such as slipping agents; delustering agents; antifoaming agents; foam inhibitors; defoaming agents; antimicrobial agents; antiseptic agents (preservatives); viscosity modifiers; thickeners; photosensitizers; and blowing agents. The curable composition may contain each of different additives alone or in combination.

The curable composition according to the present invention may be prepared typically, but not limitatively, by stirring and mixing the components at room temperature or, as needed, with heating. The curable composition according to the present invention may be used as a one-part composition, or a multi-part composition such as a two-part composition. The one-part composition contains the components, which have been blended beforehand, and is used as intact. In contrast, in the multi-part composition, two or more parts (portions) of the components are stored separately, and the two or more parts are blended in predetermined proportions before use.

The curable composition according to the present invention is preferably, but not limitatively, liquid at room temperature (about 25° C.). More specifically, assume that the curable composition according to the present invention is diluted with a solvent to give a solution containing 20% of the solvent (in particular, assume that the curable composition (solution) contains 20% by weight of methyl isobutyl ketone). In this case, the resulting composition (solution) may have a viscosity of preferably 300 to 20000 mPa·s, more preferably 500 to 10000 mPa·s, and furthermore preferably 1000 to 8000 mPa·s at 25° C. The curable composition, when having a viscosity as defined above of 300 mPa·s or more, tends to allow the cured product to have still better heat resistance. In contrast, the curable composition, when having a viscosity of 20000 mPa·s or less, tends to be prepared and handled more easily and tends to impede remaining of bubbles in the cured product. The viscosity of the curable composition according to the present invention is measured with a viscometer (trade name MCR301, supplied by Anton Paar GmbH) at an oscillation angle of a 5%, a frequency of 0.1 to 100 (1/s), and a temperature of 25° C.

Cured Product

The curable composition according to the present invention can be cured when undergoing progress of a polymerization reaction of cationically curable compounds (e.g., the polyorganosilsesquioxane according to the present invention) in the curable composition. This gives a cured product. The resulting cured product is also referred to as a "cured product according to the present invention". The curing technique may be selected as appropriate from well-known techniques without limitation. For example, curing may be performed by active energy ray irradiation and/or heating. The active energy ray may be any of infrared rays, visible light, ultraviolet rays, X rays, electron beams, alpha rays, beta rays, and gamma rays. Among them, the active energy ray is preferably an ultraviolet ray for excellent handleability.

Assume that the curable composition according to the present invention is cured by active energy ray irradiation. Conditions (e.g., active energy ray irradiation conditions) in this case are not limited, and are adjustable as appropriate according typically to the type and energy of the active energy ray to be applied, and the shape and size of the cured product. For example, in the case of ultraviolet ray irradiation, the curable composition is preferably irradiated typically at about 1 to about 1000 mJ/cm$^2$. The active energy ray irradiation may be performed typically using any of high-pressure mercury lamps, ultra-high pressure mercury lamps, xenon lamps, carbon arc, metal halide lamps, sunlight, LED lamps, and laser systems. The curing reaction may further proceed by performing a heat treatment (annealing, aging) after the active energy ray irradiation.

In contrast, assume that the curable composition according to the present invention is cured by heating. Conditions in this case are not limited, but the heating (curing) is performed typically preferably at 30° C. to 200° C., and more preferably 50° C. to 190° C. The curing time herein is settable as appropriate.

The curable composition according to the present invention, when cured, forms a cured product that offers high surface hardness and good heat resistance, is highly flexible, and has excellent processability, as described above. Consequently, the curable composition according to the present invention is preferably usable, in particular, as a "hard coat layer-forming curable composition" for the formation of a hard coat layer in a hard coat film. The hard coat layer-forming curable composition is also referred typically as a "hard-coating composition" or a "hard-coating agent". Assume that the curable composition according to the present invention is used as a hard coat layer-forming curable composition to form a hard coat layer. In this case, a hard coat film including the resulting hard coat layer maintains high hardness and good heat resistance, is still flexible, and is producible and processable by a roll-to-roll process.

Hard Coat Film

The hard coat film according to the present invention is a film that includes a substrate, and a hard coat layer disposed on or over at least one side of the substrate. The hard coat layer is a hard coat layer derived from the curable composition (hard coat layer-forming curable composition) according to the present invention. Namely, the hard coat layer is a layer of a cured product of the curable composition according to the present invention. The hard coat layer derived from the curable composition according to the present invention is herein also referred to as a "hard coat layer according to the present invention".

The hard coat layer according to the present invention in the hard coat film according to the present invention may be disposed on or over only one side of, or both sides of the substrate.

The hard coat layer according to the present invention in the hard coat film according to the present invention may be disposed partially or entirely on or over at least one side of the substrate.

The "substrate" in the hard coat film according to the present invention refers to a portion that serves as a substrate (base) of the hard coat layer and constitutes another portion than the hard coat layer according to the present invention. Non-limiting examples of the substrate include plastic substrates, metal substrates, ceramic substrates, semiconductor substrates, glass substrates, paper substrates, wood substrates (wooden substrates), surface-coated substrates, and any other known or common substrates. Among them, the substrate is preferably selected from plastic substrates, which are substrates derived from plastic materials.

Non-limiting examples of the plastic materials constituting the plastic substrates include polyesters such as poly(ethylene terephthalate)s (PETs) and poly(ethylene naphthalate)s (PENs); polyimides; polycarbonates; polyamides; polyacetals; poly(phenylene oxide)s; poly(phenylene sulfide)s; polyethersulfones; poly(ether ether ketone)s; cycloolefin polymers including homopolymers (e.g., addition polymers and ring-opened polymers) of norbornene monomers, copolymers (e.g., addition polymers, ring-opened polymer, and any other cyclic olefin copolymers) between norbornene monomers and olefinic monomers, such as norbornene-ethylene copolymers, and derivatives of them; vinyl polymers including poly(methyl methacrylate)s (PMMAs) and any other acrylic resins, polystyrenes, poly(vinyl chloride)s, and acrylonitrile-styrene-butadiene resins (ABS resins); vinylidene polymers such as poly(vinylidene chloride)s; cellulosic resins such as triacetyl cellulose (TAC); epoxy resins; phenolic resins; melamine resins; urea resins; maleimide resins; silicones; and any other plastic materials. The plastic substrates may include (may be derived from) each of different plastic materials alone or in combination.

Assume that a hard coat film having excellent transparency is to be obtained as the hard coat film according to the present invention. In particular in this case, the plastic substrate for use herein is preferably selected from substrates having excellent transparency (transparent substrates) and is more preferably selected from polyester films (in particular, films of PETs and PENs), cycloolefin polymers films, polycarbonate films, TAC films, and PMMA films.

The plastic substrate may include one or more additives as needed. Non-limiting examples of the additives include antioxidants, ultraviolet absorbers, photostabilizers, thermal stabilizers, crystal nucleators, flame retardants, flame retardant promotors, fillers, plasticizers, impact modifiers, reinforcers, dispersing agents, antistatic agents, blowing agents, antimicrobial agents, and any other additives. The plastic substrate may include each of different additives alone or in combination.

The plastic substrate may have a single-layer structure or a multilayer structure and is not limited in structure (configuration). For example, the plastic substrate for use herein may be selected from plastic substrates each having a multilayer structure and including a plastic film, and another layer disposed on at least one side of the plastic film. The "other layer" refers to a layer other than the hard coat layer according to the present invention. Examples of the multilayer structure include a structure including the plastic film and the other layer disposed in this order; and a structure including the other layer, the plastic film, and the other layer disposed in this order. Non-limiting examples of the other layer include hard coat layers other than the hard coat layer according to the present invention. Exemplary materials constituting the other layer include the plastic materials.

The plastic substrate may have undergone a surface treatment in part or all of its surface. Non-limiting examples of the surface treatment include roughening treatment, adhesion facilitating treatment, antistatic treatment, sand blasting (sand matting), corona discharge treatment, plasma treatment, chemical etching, water matting, flame treatment, acid treatment, alkaline treatment, oxidation, ultraviolet irradiation, silane coupling agent treatment, and any other known or common surface treatments. The plastic substrate may be an unoriented film or an oriented film (e.g., uniaxially oriented film or biaxially oriented film).

The plastic substrate may be produced by a known or common process. For example, the plastic substrate may be produced by a process of forming the plastic material into a film to give the plastic substrate (plastic film); or by a process of further forming an appropriate layer (e.g., the other layer) as needed on the prepared plastic film, and/or subjecting the plastic film to an appropriate surface treatment. The plastic substrate may also be selected from commercial products.

The thickness of the substrate is not limited, but may be selected as appropriate within the range of typically from 0.01 to 10000 μm.

The hard coat layer according to the present invention in the hard coat film according to the present invention is a layer constituting at least one surface layer of the hard coat film according to the present invention and is a layer (cured product layer) including a cured product (cured resin product) of the curable composition (hard coat layer-forming curable composition) according to the present invention.

The hard coat layer according to the present invention may have a thickness not limited, but of preferably 1 to 200 μm, and more preferably 3 to 150 μm. When the hard coat film includes the hard coat layers according to the present invention on both sides of the substrate, the "thickness" refers to the thickness of each (single) hard coat layer. In particular, the hard coat layer according to the present invention can maintain high surface hardness (e.g., can maintain a pencil hardness of H or higher), even when the hard coat layer has a small thickness (e.g., a thickness of 5 μm or less). In addition, the hard coat layer is resistant to defects such as cracking due typically to cure shrinkage, even when the hard coat layer has a large thickness (e.g., a thickness of 50 μm or more). This allows the hard coat layer to have a large thickness and to thereby have a significantly higher pencil hardness (e.g., a pencil hardness of 9H or higher).

The hard coat layer according to the present invention may have a haze not limited, but of preferably 1.5% or less, and more preferably 1.0% or less, at a thickness of 50 μm. The lower limit of the haze is not limited, but typically 0.1%. The hard coat layer, when having a haze of, in particular, 1.0% or less, tends to be advantageously usable typically in uses that require very high transparency. For example, the hard coat layer is advantageously usable typically as or in surface-protecting sheets in displays such as touch screens. The haze of the hard coat layer according to the present invention may be measured in conformity to JIS K 7136.

The hard coat layer according to the present invention may have a total luminous transmittance not limited, but of preferably 85% or more, and more preferably 90% or more, at a thickness of 50 μm. The upper limit of the total luminous transmittance is not limited, but typically 99%. The hard coat layer, when having a total luminous transmittance of, in particular, 85% or more, tends to be advantageously usable typically in uses that require very high transparency. For example, the hard coat layer is advantageously usable typically as or in surface-protecting sheets in displays such as touch screens. The total luminous transmittance of the hard coat layer according to the present invention may be measured in conformity to JIS K 7361-1.

The hard coat film according to the present invention may further include a surface-protecting film on or over the hard coat layer according to the present invention. The hard coat film according to the present invention, when including the surface-protecting film, tends to have still better punching processability. Assume that the hard coat film includes the surface-protecting film as mentioned above. In this case, the hard coat film can undergo punching using a Thomson blade without troubles such as delamination (peeling) from the substrate and cracking, even when, for example, the hard coat layer has very high hardness and is susceptible to these troubles upon punching.

The surface-protecting film may be selected from, but is not limited to, known or common surface-protecting films, such as one including a plastic film and a pressure-sensitive adhesive layer on the plastic film. Non-limiting examples of the plastic film include plastic films made from plastic materials including polyesters such as (poly(ethylene terephthalate)s and poly(ethylene naphthalate)s; polyolefins such as polyethylenes, polypropylenes, and cycloolefin polymers; polystyrenes; acrylic resins; polycarbonates; epoxy resins; fluorocarbon resins; silicone resins; diacetate resins; triacetate resins; polyarylates; poly(vinyl chloride)s; polysulfones; polyethersulfones; poly(ether ether imide)s; polyimides; and polyamides. Non-limiting examples of the pressure-sensitive adhesive layer include pressure-sensitive adhesive layers each derived from (or including) one or more of known or common pressure-sensitive adhesives. Examples of the pressure sensitive adhesives include, but are not limited to, pressure-sensitive adhesives based on any of acrylic polymers, natural rubbers, synthetic rubbers, ethylene-vinyl acetate copolymers, ethylene-(meth)acrylic ester copolymers, styrene-isoprene block copolymers, and styrene-butadiene block copolymers. The pressure-sensitive adhesive layer may contain one or more additives such as antistatic agents and slipping agents. Each of the plastic film and the pressure-sensitive adhesive layer may independently have a single-layer structure or a multilayer structure. The thickness of the surface-protecting film is not limited and may be selected as appropriate.

The surface-protecting film is available from the market as commercial products typically under the trade names SUNYTECT Series (from Sun A. Kaken Co., Ltd.), the trade names E-MASK Series (from Nitto Denko Corporation), the trade names MASTACK Series (from Fujimori Kogyo Co., Ltd), the trade names HITALEX Series (from Hitachi Chemical Company, Ltd.), and the trade names ALPHAN Series (from Oji F-Tex Co., Ltd.).

The hard coat film according to the present invention may be produced in conformity to any known or common method for producing a hard coat film without limitation. For example, the hard coat film may be produced by applying the curable composition (hard coat layer-forming curable composition) according to the present invention onto at least one side of the substrate, as needed drying the applied layer to remove the solvent, and curing the curable composition (curable composition layer). Conditions for curing of the curable composition are not limited and are selectable as appropriate typically from the conditions for the formation of the cured product.

In particular, the hard coat layer according to the present invention in the hard coat film according to the present invention is a hard coat layer formed from (derived from) the curable composition (hard coat layer-forming curable composition) according to the present invention, which is capable of giving a cured product that is highly flexible and has excellent processability. This allows the hard coat film according to the present invention to be producible by a roll-to-roll process. The hard coat film according to the present invention, when produced by a roll-to-roll process, can be produced with significantly better productivity. Assume that the hard coat film according to the present invention is produced by a roll-to-roll process. In this case, the hard coat film may be produced by any known or common production method according to the roll-to-roll process. Non-limiting examples of the production method include Steps A, B, and C as essential steps and perform Steps A, B, and C successively. In Step A, a wound, roll-shaped substrate is unwound. In Step B, the curable composition (hard coat layer-forming curable composition) according to the present invention is applied onto at least one side of the unwound substrate. Next, the applied layer is dried as needed to remove the solvent, and the curable composition (curable composition layer) is cured to form the hard coat layer according to the present invention on the substrate to give a hard coat film. In Step C, the prepared hard coat film is rewound into a roll. The method may further include one or more other steps in addition to Steps A, B, and C.

The hard coat film according to the present invention may have a thickness not limited and may have a thickness selected as appropriate within the range of 1 to 10000 μm.

The hard coat layer according to the present invention in the hard coat film according to the present invention may have a surface pencil hardness not limited, but of preferably H or higher, more preferably 2H or higher, and furthermore preferably 6H or higher. The pencil hardness may be determined in conformity to the method prescribed in JIS K 5600-5-4.

The hard coat film according to the present invention may have a haze not limited, but of preferably 1.5% or less, and more preferably 1.0% or less. The lower limit of the haze is not limited, but is typically 0.1%. The hard coat film, when having a haze of, in particular, 1.0% or less tends to be advantageously usable typically in uses that require very high transparency. For example, the hard coat film is advantageously usable typically as or in surface-protecting sheets in displays such as touch screens. The haze of the hard coat film according to the present invention is easily controllable within the range typically by using any of the transparent substrates as the substrate. The haze may be measured in conformity to JIS K 7136.

The hard coat film according to the present invention may have a total luminous transmittance not limited, but of preferably 85% or more, and more preferably 90% or more. The upper limit of the total luminous transmittance is not limited, but is typically 99%. The hard coat film, when having a total luminous transmittance of, in particular, 90% or more, tends to be advantageously usable typically in uses that require very high transparency. For example, the hard coat film is advantageously usable typically as or in surface-protecting sheets in displays such as touch screens. The total luminous transmittance of the hard coat film according to the present invention is easily controllable within the range typically by using any of the transparent substrates as the substrate. The total luminous transmittance may be measured in conformity to JIS K 7361-1.

The hard coat film according to the present invention is still flexible, and is producible and processable by a roll-to-roll process even while sustaining high hardness and good heat resistance. The hard coat film, as having this configuration, has high quality and offers excellent productivity. In particular, the hard coat film, when including the surface-protecting film on or over the hard coat layer according to the present invention, further offers excellent punching processability. The hard coat film is therefore preferably usable in every use that requires these properties. For example, the hard coat film according to the present invention is usable typically as surface-protecting films in various products; as surface-protecting films in members or parts of various products; and as components of various products or of members or parts of the products. Non-limiting examples of the products include display devices such as liquid crystal displays and organic electroluminescent displays; input devices such as touch screens; solar cells; various household electrical appliances; various electrical-electronic products; various electrical-electronic products including portable electronic terminals such as game equipment, personal computers, tablet computers, smartphones, and cellular phones; and various optical devices. In embodiments, the hard coat film according to the present invention is used as components of various products, or of members or parts of the products. For example, in an embodiment, the hard coat film is used in a touch screen and constitutes a laminate including the hard coat film and a transparent conductive film.

The curable composition according to the present invention, when cured, gives a cured product that has surface hardness, heat resistance, flexibility, and processability at excellent levels as described above, and still offers excellent adhesiveness and adhesion to an adherend. Accordingly, the curable composition according to the present invention is also preferably usable as an adhesive. This adhesive is also referred to as an "adhesive composition". The adhesive obtained using the curable composition according to the present invention as the adhesive composition, when cured, is converted into an adhesive member that has surface hardness, heat resistance, flexibility, processability, adhesiveness, and adhesion at excellent levels. For example, the adhesive is usable as a photocurable adhesive when the curable composition according to the present invention contains a cationic photoinitiator as the curing catalyst; and the adhesive is usable as a thermosetting adhesive when the curable composition contains a cationic thermal initiator as the curing catalyst.

The use of the curable composition (adhesive composition) according to the present invention gives an adhesive sheet (also referred to as "adhesive sheet according to the present invention), which includes a substrate, and an adhesive layer on or over the substrate. The adhesive layer is a layer of the curable composition according to the present invention. This adhesive layer is also referred to as an "adhesive layer according to the present invention". The adhesive sheet according to the present invention may be not only in a sheet form, but also in a form similar to a sheet, such as a film form, a tape form, or a plate form. The adhesive sheet according to the present invention may be obtained typically, but not limitatively, by applying the curable composition according to the present invention to a substrate and, as needed, drying the applied composition. The application (coating) may be performed by any known or common procedure or device without limitation. The drying may also be performed with any procedure or device under any conditions without limitation. For example, the drying may be performed under such conditions so as to remove volatile components such as the solvent as much as possible and may employ any known or common procedure or device.

The adhesive sheet according to the present invention may be a single-sided adhesive sheet, which includes an adhesive layer on only one side of a substrate; or a double-sided adhesive sheet, which includes adhesive layers on both sides of a substrate. When the adhesive sheet according to the present invention is a double-sided adhesive sheet, the adhesive layer according to the present invention has only to constitute at least one of the adhesive layers. The other adhesive layer may be the adhesive layer according to the present invention or another adhesive layer.

The substrate in the adhesive sheet according to the present invention may be selected from any of known or common substrates (those for use in adhesive sheets) without limitation. Non-limiting examples of such substrates include plastic substrates, metal substrates, ceramic substrates, semiconductor substrates, glass substrates, paper substrates, woody substrates, and surface-coated substrates. Specific examples of the substrate are as with the substrate in the hard coat film according to the present invention. Typically, the substrate in the adhesive sheet according to the present invention may also be a so-called release liner, or may be one as with the surface-protecting film for use in the hard coat film according to the present invention. The adhesive sheet according to the present invention may include the substrate as one layer, or as two or more layers.

The thickness of the substrate is not limited and is selectable as appropriate typically within the range of 1 to 10000 μm.

The adhesive sheet according to the present invention may include each of different adhesive layers according to the present invention alone or in combination. The thickness of the adhesive layer according to the present invention is not limited and is selectable as appropriate typically within the range of 0.1 to 10000 μm. This is also true for the other adhesive layer. The "other adhesive layer" refers to an adhesive layer other than the adhesive layer according to the present invention.

The adhesive sheet according to the present invention may further include one or more other layers in addition to the substrate and the adhesive layer(s). The other layer is exemplified by, but is not limited to, intermediate layers and under coats.

The use of the curable composition (adhesive composition) according to the present invention gives a laminate (laminated assembly) (also referred to as "laminate according to the present invention"), which includes three or more layers (at least three layers). The at least three layers include two adherend layers, and an adhesive layer disposed between the two adherend layers. The adhesive layer serves as a layer that bonds the adherend layers with each other. The adhesive layer is a layer of the cured product of the curable composition according to the present invention. This adhesive layer is also referred to as an "adhesive layer according to the present invention". The laminate according to the present invention may be obtained typically, but not limitatively, by forming an adhesive layer according to the present invention on one of the two adherend layers, applying the other adherend layer to the formed adhesive layer, and then subjecting the resulting article typically to light irradiation and/or heating to cure the adhesive layer according to the present invention. The formation of the adhesive layer may be performed typically in a manner as with the adhesive layer in the adhesive sheet according to the present invention. Assume that the laminate according to the present invention is prepared using a single-sided adhesive sheet as the adhesive sheet according to the present invention. In this case, the laminate may be obtained by applying the adhesive sheet according to the present invention to an adherend layer, and subjecting the resulting article typically to light irradiation and/or heating to cure the adhesive layer according to the present invention in the adhesive sheet. In the resulting laminate, the substrate in the adhesive sheet according to the present invention corresponds to an adherend layer. Assume that the laminate according to the present invention is prepared typically using the adhesive sheet according to the present invention that is a double-sided adhesive sheet including a release liner as the substrate (carrier). In this case, the laminate may be obtained by applying the adhesive sheet according to the present invention to one adherend layer, removing the release liner to expose the adhesive layer, applying the other adherend layer to the exposed adhesive layer, and subjecting the resulting article typically to light irradiation and/or heating to cure the adhesive layer according to the present invention. However, the method for producing the laminate according to the present invention is not limited to the methods mentioned above.

The adherend in the laminate according to the present invention is not limited and is exemplified as with the substrate in the hard coat film according to the present invention. The laminate according to the present invention may include only two adherend layers or include three or more adherend layers. The thickness of the adherend layer is not limited and may be selected as appropriate typically within the range of 1 to 100000 μm. The adherend does not have to have a layer form in a strict sense.

The laminate according to the present invention may include each of different adhesive layers according to the present invention alone or in combination. The thickness of the adhesive layer according to the present invention is not limited and may be selected as appropriate typically within the range of 0.1 to 10000 μm.

The laminate according to the present invention may include one or more other layers in addition to the adherend (s) and the adhesive layer(s) in the present invention. The other layers are exemplified by, but are not limited to, intermediate layers, under coats, and other adhesive layers.

The curable composition (adhesive composition) according to the present invention is usable not only for the preparation of the adhesive sheet according to the present invention and the laminate according to the present invention, but for other various uses in which desired articles (e.g., parts) are bonded with each other.

EXAMPLES

The present invention will be illustrated in further detail with reference to several examples below. It should be noted, however, that the examples are by no means intended to limit the scope of the present invention. The molecular weight of each product was measured using Alliance HPLC System 2695 (supplied by Waters Corporation), Refractive Index Detector 2414 (supplied by Waters Corporation), two Tskgel GMH$_{HR}$-M columns (supplied by Tosoh Corporation) with a Tskgel guard column H$_{HR}$L (supplied by Tosoh Corporation) as a guard column, COLUMN HEATER U-620 (supplied by Sugai) as a column oven, and THF solvent, at a measurement temperature of 40° C. The T3 to T2 ratio of the T2 unit to the T3 unit in the product was measured by $^{29}$Si-NMR spectrometry with JEOL ECA500 (500 MHz). The 5% weight loss temperature T$_{d5}$ of the product was measured by thermogravimetry (TGA) in an air atmosphere at a rate of temperature rise of 5° C./min.

Hereinafter the blending amounts of the trade names HS-1PC, CPI-101A, UV9380C, HS-1A, and SI-100L are each indicated in terms of solids content.

Example 1

Materials used were 161.5 mmol (39.79 g) of 2-(3,4-epoxycyclohexyl)ethyltrimethoxysilane (hereinafter also referred to as "EMS"), 9 mmol (1.69 g) of phenyltrimethoxysilane (hereinafter also referred to as "PMS"), and 165.9 g of acetone. In a nitrogen stream, the materials were placed in a 300-ml flask (reactor) equipped with a thermometer, a stirrer, a reflux condenser, and a nitrogen inlet tube, followed by temperature rise to 50° C. to give a mixture. To the prepared mixture, was added dropwise 4.70 g (1.7 mmol in terms of potassium carbonate) of a 5% aqueous solution of potassium carbonate over 5 minutes, followed by 1700 mmol (30.60 g) of water added dropwise over 20 minutes. No significant temperature rise occurred during the dropwise additions. The mixture was then subjected to a polycondensation reaction in a nitrogen stream for 4 hours while keeping the temperature at 50° C.

A product in the reaction mixture after the polycondensation reaction was analyzed and found to have a number-average molecular weight of 1911 and a molecular-weight dispersity of 1.47. The product was found to have a T3 to T2 ratio of the T3 unit to the T2 unit of 10.3, as calculated from the $^{29}$Si-NMR spectrum of the product.

Subsequently, the reaction mixture was cooled, washed with water until a lower layer liquid became neutral, and an upper layer liquid was isolated. The solvent was distilled off from the upper layer liquid at 40° C. and 1 mmHg. This yielded a colorless, transparent, liquid product (an epoxy-containing polyorganosilsesquioxane). The product had a $T_{d5}$ of 370° C.

Examples 2 to 6 and Comparative Examples 1 and 2

Epoxy-containing polyorganosilsesquioxanes were produced each by a procedure similar to that in Example 1, except for changing the amounts of the starting materials (EMS and PMS), the type and amount of the solvent, the reaction temperature, the amount of the 5% potassium carbonate aqueous solution, the amount of water, and the reaction time as given in Table 1. Table 1 presents the number-average molecular weight (Mn), the molecular-weight dispersity, the T3 to T2 ratio of the T3 unit to the T2 unit, and the $T_{d5}$ of the epoxy-containing polyorganosilsesquioxanes prepared in the examples and comparative examples. The $T_{d5}$ in Table 1 is indicated in degree Celsius (° C.).

80 W/cm$^2$. Lastly, the article was subjected to a heat treatment (aging) at 80° C. for 2 hours to cure the layer of the applied hard-coating composition. This yielded a hard coat film including the hard coat layer.

Examples 8 to 17 and 19, and Comparative Examples 3 and 4

Hard-coating compositions were prepared each by a procedure similar to that in Example 7, except for changing the formulation of the hard-coating composition (curable composition) and the thickness of the hard coat layer, as given in Table 2. Hard coat films were prepared each by a procedure similar to that in Example 7, except for using the prepared corresponding hard-coating composition and changing the thickness of the hard coat layer as given in Table 2. In Table 2, the blending amounts of starting materials for the curable compositions are indicated in part by weight.

Example 18

A solution mixture was prepared as a hard-coating composition (curable composition) by blending 100 parts by weight of the epoxy-containing polyorganosilsesquioxane (S-1) prepared in Example 1, 20 parts by weight of methyl

TABLE 1

|  |  | Example 1 | Example 2 | Example 3 | Example 4 | Example 5 | Example 6 | Com. Ex. 1 | Com. Ex. 2 |
|---|---|---|---|---|---|---|---|---|---|
| Silsesquioxane production | EMS (g) | 39.79 | 39.79 | 39.79 | 39.79 | 39.79 | 49.28 | 19.71 | 19.71 |
|  | PMS (g) | 1.69 | 1.69 | 1.69 | 1.69 | 1.69 | 0 | 23.8 | 23.8 |
|  | Solvent | acetone | dioxane | acetone | acetone | acetone | acetone | dioxane | acetone |
|  | Solvent amount (g) | 165.9 | 165.9 | 165.9 | 83.0 | 165.9 | 165.9 | 174.03 | 174.3 |
|  | Reaction temperature (° C.) | 50 | 70 | 50 | 50 | 50 | 50 | 30 | 50 |
|  | 5% K$_2$CO$_3$ aq (g) | 4.70 | 4.70 | 4.70 | 4.70 | 4.70 | 4.70 | 4.70 | 5.53 |
|  | H$_2$O (g) | 30.6 | 15.3 | 30.6 | 30.6 | 30.6 | 30.6 | 15.3 | 36 |
|  | Reaction time (hr) | 4 | 2 | 1 | 3 | 7 | 5 | 2 | 5 |
| Silsesquioxane | Sample name | S-1 | S-2 | S-3 | S-4 | S-5 | S-7 | S-6 | S-8 |
|  | Mn | 1911 | 1248 | 1429 | 2496 | 2050 | 1808 | 971 | 1795 |
|  | Molecular-weight dispersity | 1.47 | 1.18 | 1.37 | 1.78 | 1.64 | 1.47 | 1.16 | 1.7 |
|  | T3 to T2 ratio | 10.3 | 5.7 | 6.0 | 12.2 | 11.2 | 11.0 | 0.6 | 15.1 |
|  | $T_{d5}$ | 370 | 371 | 385 | 360 | 363 | 374 | 260 | 394 |

The polyorganosilsesquioxanes prepared in Examples 1 to 6 were subjected to FT-IR spectra measurement with the apparatus under conditions mentioned above and were each found to have one intrinsic absorption peak at about 1100 cm$^{-1}$.

Example 7

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of a curing catalyst 1 ([diphenyl[4-(phenylthio)phenyl]sulfonium tris(pentafluoroethyl)trifluorophosphate]).

The above-prepared hard-coating composition was applied onto a PET film (trade name KEB03 W, supplied by Teijin DuPont Films Japan Limited) by flow casting using a wire bar so as to form a hard coat layer having a thickness after curing of 5 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of isobutyl ketone (supplied by Kanto Chemical Co., Inc.), and 1 part by weight of the trade name SI-100L (a thermal acid generator, supplied by SANSHIN CHEMICAL INDUSTRY CO., LTD.).

The above-prepared hard-coating composition was applied onto a PET film (trade name KEB03 W, supplied by Teijin DuPont Films Japan Limited) by flow casting using a wire bar so as to form a hard coat layer having a thickness after curing of 25 μm. The resulting article was left stand in an oven at 70° C. for 10 minutes and then subjected to a heat treatment at 150° C. for one hour to thermally cure the layer of the applied hard-coating composition. This gave a hard coat film including the hard coat layer.

The above-prepared hard coat film was examined and evaluated on various points according to methods as follows. Results are presented in Table 2.

(1) Haze and Total Luminous Transmittance

The haze and the total luminous transmittance of the above-prepared hard coat film were measured using a haze meter (NDH-300A, supplied by Nippon Denshoku Industries Co., Ltd.).

(2) Surface Hardness (Pencil Hardness)

The pencil hardness of the hard coat layer surface of the above-prepared hard coat film was evaluated in conformity to JIS K 5600-5-4.

(3) Heat Resistance (5% Weight Loss Temperature ($T_{d5}$))

A hard coat film was prepared by the procedure as above, except for using a glass plate instead of the PET film. About 5 mg of the hard coat layer in the hard coat film was cut out using a cutter, and this was used as a sample. The 5% weight loss temperature of the sample was measured using a thermogravimeter/differential thermal analyzer (TG/DTA 6300, supplied by Seiko Instruments Inc.) under conditions as follows:

Measurement temperature range: 25° C. to 550° C.
Rate of temperature rise: 10° C./min.
Gas atmosphere: nitrogen (4) Scratch Resistance The hard coat layer surface in the above-prepared hard coat film was rubbed by 100 reciprocating movements of a steel wool #0000 under a load of 1000 g/cm². Whether and how many scratches were formed on the hard coat layer surface were examined, and the scratch resistance was evaluated according to criteria as follows:

Very good (VG) (very good scratch resistance): no scratch was formed;

Good (good scratch resistance): one to ten scratches were formed; and

Poor (poor scratch resistance): greater than ten scratches were formed.

(5) Flexibility (Cylindrical Mandrel Method): Mandrel Test

The flexibility of the above-prepared hard coat film was evaluated using a cylindrical mandrel in conformity to JIS K 5600-5-1.

TABLE 2

| | | | Example 7 | Example 8 | Example 9 | Example 10 | Example 11 | Example 12 | Example 13 | Example 14 |
|---|---|---|---|---|---|---|---|---|---|---|
| Curable composition | Silsesquioxane | S-2 | — | — | — | 100 | 100 | — | — | — |
| | | S-1 | 100 | 100 | 100 | — | — | — | — | 100 |
| | | S-3 | — | — | — | — | — | 100 | — | — |
| | | S-4 | — | — | — | — | — | — | 100 | — |
| | | S-6 | — | — | — | — | — | — | — | — |
| | | S-7 | — | — | — | — | — | — | — | — |
| | | S-8 | — | — | — | — | — | — | — | — |
| | Initiator | CPI-210S | 1 | 1 | 1 | 1 | 1 | 1 | 1 | — |
| | | HS-1PC | — | — | — | — | — | — | — | 1 |
| | | CPI-101A | — | — | — | — | — | — | — | — |
| | | UV9380C | — | — | — | — | — | — | — | — |
| | | HS-1A | — | — | — | — | — | — | — | — |
| | | SI-100L | — | — | — | — | — | — | — | — |
| | Solvent | Methyl isobutyl ketone | 20 | 20 | 20 | 20 | 20 | 20 | 20 | 20 |
| Evaluations | | Hard coat layer thickness (μm) | 5 | 25 | 50 | 5 | 115 | 25 | 20 | 30 |
| | | Haze (%) | 0.92 | 0.91 | 1.0 | 0.96 | 0.93 | 0.97 | 0.67 | 0.66 |
| | | Total luminous transmittance (%) | 91 | 91 | 91 | 91 | 91 | 91 | 92 | 91 |
| | | Pencil hardness | 4H | 6H | 9H | 2H | 9H | 3H | 4H | 9H |
| | | $T_{d5}$ (° C.) | 330 | 340 | 333 | 328 | 342 | 331 | 329 | 383 |
| | | Scratch resistance (1 kg/cm²) | Good | VG | VG | Good | VG | Good | Good | VG |
| | | Mandrel test (diameter) | 2 | 12 | 32 | 2 | >32 | 16 | 12 | 20 |

| | | | Example 15 | Example 16 | Example 17 | Example 18 | Example 19 | Com. Ex. 3 | Com. Ex. 4 |
|---|---|---|---|---|---|---|---|---|---|
| Curable composition | Silsesquioxane | S-2 | — | — | — | — | — | — | — |
| | | S-1 | 100 | 100 | 100 | 100 | — | — | — |
| | | S-3 | — | — | — | — | — | — | — |
| | | S-4 | — | — | — | — | — | — | — |
| | | S-6 | — | — | — | — | — | 100 | — |
| | | S-7 | — | — | — | — | 100 | — | — |
| | | S-8 | — | — | — | — | — | — | 100 |
| | Initiator | CPI-210S | — | — | — | — | — | 1 | — |
| | | HS-1PC | — | — | — | — | 1 | — | 1 |
| | | CPI-101A | 1 | — | — | — | — | — | — |
| | | UV9380C | — | 1 | — | — | — | — | — |
| | | HS-1A | — | — | 1 | — | — | — | — |
| | | SI-100L | — | — | — | 1 | — | — | — |
| | Solvent | Methyl isobutyl ketone | 20 | 20 | 20 | 20 | 20 | 20 | 20 |
| Evaluations | | Hard coat layer thickness (μm) | 35 | 40 | 40 | 25 | 30 | 5 | 30 |
| | | Haze (%) | 1.31 | 0.61 | 0.42 | 1.0 | 1.5 | 0.98 | 1.7 |
| | | Total luminous transmittance (%) | 91 | 91 | 91 | 91 | 91 | 91 | 90 |

TABLE 2-continued

| | | | | | | | |
|---|---|---|---|---|---|---|---|
| Pencil hardness | 8H | 9H | 7H | 7H | 9H | 68 | H |
| $T_{d5}$ (° C.) | 437 | 384 | 410 | 436 | 373 | 321 | 390 |
| Scratch resistance (1 kg/cm$^2$) | VG | VG | VG | VG | VG | Poor | Good |
| Mandrel test (diameter) | 25 | 32 | 32 | 16 | 20 | 2 | 2 |

The abbreviations given in Table 2 refer to as follows. The sample names of polyorganosilsesquioxanes correspond to the sample names given in Table 1.

Curing catalyst 1: [diphenyl[4-(phenylthio)phenyl]sulfonium tris(pentafluoroethyl)trifluorophosphate], a photoacid generator HS-1PC: trade name HS-1PC (supplied by San-Apro Ltd.), a photoacid generator CPI-101A: trade name CPI-101A (supplied by San-Apro Ltd.), a photoacid generator UV9380C: trade name UV9380C (supplied by Momentive Performance Materials Japan LLC), a photoacid generator HS-1A: trade name HS-1A (supplied by San-Apro Ltd.), a photoacid generator SI-100L: trade name San-Aid SI-100L (supplied by SAN-SHIN CHEMICAL INDUSTRY CO., LTD.), a thermal acid generator

Example 20

A surface-protecting film (MASTACK NBO-0424, supplied by Fujimori Kogyo Co., Ltd.) was applied onto the hard coat layer of the hard coat film prepared in Example 14 and yielded a hard coat film bearing the surface-protecting film. The resulting hard coat film was subjected to punching using a dumbbell sample cutting machine equipped with the Super Dumbbell Cutter (Model: SDK-500-D, in conformity to JIS K 7133-2). It was demonstrated that the hard coat film could be punched without delamination (peeling) of the hard coat layer from the substrate and without cracking of the hard coat layer.

FIG. 1 illustrates a photomicrograph (100-fold magnification) of ends of the hard coat film after the punching, where the photomicrograph was taken with a digital microscope. As illustrated in FIG. 1, neither delamination of the hard coat layer from the substrate nor cracking in the hard coat layer occurred.

Example 21

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of the trade name HS-1PC (a photoacid generator, supplied by San-Apro Ltd.).

The above-prepared hard-coating composition was applied onto a 78-μm thick TAC film (#80, supplied by Daicel Corporation) by flow casting using a wire bar so as to form a hard coat layer having a thickness after curing of 50 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of 80 W/cm$^2$). Lastly, the article was subjected to a heat treatment (aging) at 80° C. for 2 hours to cure the layer of the applied hard-coating composition. This yielded a hard coat film including the hard coat layer.

Example 22

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of the trade name HS-1PC (a photoacid generator, supplied by San-Apro Ltd.).

The above-prepared hard-coating composition was applied onto a 300-μm thick cycloolefin copolymer film (trade name TOPAS 6013, supplied by Polyplastics Co., Ltd.) by flow casting using a wire bar so as to form a hard coat layer having a thickness after curing of 45 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of 80 W/cm$^2$. Lastly, the article was subjected to a heat treatment (aging) at 80° C. for 2 hours to cure the layer of the applied hard-coating composition. This yielded a hard coat film including the hard coat layer.

Example 23

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of the trade name HS-1PC (a photoacid generator, supplied by San-Apro Ltd.).

The above-prepared hard-coating composition was applied onto a 2024-μm thick acrylic polymer film (trade name SUMIPEX X, supplied by Sumitomo Chemical Co., Ltd.) by flow casting using a wire bar so as to form a hard coat layer having a thickness after curing of 32 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of 80 W/cm$^2$. Lastly, the article was subjected to a heat treatment (aging) at 80° C. for 2 hours to cure the layer of the applied hard-coating composition. This yielded a hard coat film including the hard coat layer.

Example 24

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of the trade name HS-1PC (a photoacid generator, supplied by San-Apro Ltd.).

The above-prepared hard-coating composition was applied onto a 129-μm thick PEN film (trade name Teonex #125, supplied by Teijin DuPont Films Japan Limited) by flow casting using a wire bar so as to form a hard coat layer having a thickness after curing of 34 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of 80 W/cm$^2$. Lastly, the article was subjected to a heat treatment (aging) at 80° C. for 2 hours to cure the layer of the applied hard-coating composition. This yielded a hard coat film including the hard coat layer.

Example 25

A solution mixture was prepared as a hard-coating composition (curable composition) by blending 100 parts by weight of the epoxy-containing polyorganosilsesquioxane (S-1) prepared in Example 1, 20 parts by weight of methyl isobutyl ketone (supplied by Kanto Chemical Co., Inc.), and 1 part by weight of the trade name HS-1PC (a photoacid generator, supplied by San-Apro Ltd.).

The above-prepared hard-coating composition was applied onto a 100-μm thick polycarbonate film (trade name SUNLOID PC, supplied by Sumitomo Bakelite Co., Ltd.) by flow casting using a wire bar so as to form a hard coat layer having a thickness after curing of 45 μm. The resulting article was left stand in an oven at 70° C. for 10 minutes (for prebaking) and then irradiated with an ultraviolet ray under irradiation conditions at an irradiance of 312 mJ/cm$^2$ and an irradiation intensity of 80 W/cm$^2$. Lastly, the article was subjected to a heat treatment (aging) at 80° C. for 2 hours to cure the layer of the applied hard-coating composition. This yielded a hard coat film including the hard coat layer.

The hard coat films prepared in Examples 21 to 25 were examined to measure and evaluate the haze and total luminous transmittance of the hard coat film, and the pencil hardness of the hard coat layer surface. The haze, total luminous transmittance, and pencil hardness were measured and evaluated by the above-mentioned methods.

Table 3 also presents the measurement and evaluation results of the haze, total luminous transmittance, and pencil hardness (substrate surface) of the substrate (substrate alone) in the hard coat films prepared in Examples 21 to 25.

strates. In addition, it was demonstrated that the hard coat films according to the present invention are applicable to a variety of substrates as substrates constituting the hard coat films.

Example 26

Materials used were 1757.5 mmol (433.0 g) of 2-(3,4-epoxy)cyclohexylethyltrimethoxysilane (EMS), 93 mmol (18.34 g) of phenyltrimethoxysilane (PMS), and 1805.4 g of acetone. In a nitrogen stream, the materials were placed in a 5-liter separable flask (reactor) equipped with a thermometer, a stirrer, a reflux condenser, and a nitrogen inlet tube, followed by temperature rise to 50° C. to give a mixture. To the prepared mixture, was added dropwise 51.14 g (18.5 mmol in terms of potassium carbonate) of a 5% aqueous solution of potassium carbonate over 5 minutes, followed by 18.5 mol (333.0 g) of water over 20 minutes. No significant temperature rise occurred during the dropwise additions. While keeping the temperature at 50° C., the mixture was then subjected to a polycondensation reaction in a nitrogen stream for 5 hours.

A product in the reaction mixture after the polycondensation reaction was analyzed and found to have a number-average molecular weight of 1800 and a molecular-weight dispersity of 1.55. The product was found to have a T3 to T2 ratio of the T3 unit to the T2 unit of 10.3, as calculated from the $^{29}$Si-NMR spectrum of the product.

Subsequently, the reaction mixture was cooled and, simultaneously, combined with 902.7 g of methyl isobutyl ketone and 660 g of a 5% sodium chloride aqueous solution, followed by water washing. After separation, the aqueous layer was drawn out, the residual liquid was combined again with 902.7 g of methyl isobutyl ketone and washed with water until a lower layer liquid became neutral. The upper layer liquid was isolated, from which the solvent was distilled off at 50° C. and 1 mmHg. This yielded about 457 g of a colorless, transparent, liquid product (epoxy-containing polyorganosilsesquioxane; polyorganosilsesquioxane having an epoxy content of 95% by mole and a phenyl content of a 5% by mole). The product contained 27.23% by weight of methyl isobutyl ketone.

TABLE 3

|  |  | Substrate thickness (μm) | Total thickness (μm) | Hard coat layer thickness (μm) | Haze (%) | Total luminous transmittance (%) | Pencil hardness |
|---|---|---|---|---|---|---|---|
| Example 21 | Hard coat film | 78 | 128 | 50 | 0.78 | 41.22 | 9H |
|  | Substrate alone (TAC #80) | 78 | 78 | — | 0.44 | 41.59 | H |
| Example 22 | Hard coat film | 300 | 345 | 45 | 0.47 | 91.81 | 2H |
|  | Substrate alone (TOPAS 6013) | 300 | 300 | — | 0.43 | 92.11 | 6B or lower |
| Example 23 | Hard coat film | 2024 | 2056 | 32 | 1.02 | 79.1 | 6H |
|  | Substrate alone (SUMIPEX X) | 2024 | 2024 | — | 0.14 | 80.19 | 4B |
| Example 24 | Hard coat film | 129 | 163 | 34 | 3.09 | 39.82 | 7H |
|  | Substrate alone (Teonex #125) | 129 | 129 | — | 0.89 | 39.39 | H |
| Example 25 | Hard coat film | 100 | 145 | 45 | 0.58 | 91.27 | HB |
|  | Substrate alone (SUNLOID PC) | 100 | 100 | — | 0.12 | 91.85 | 6B or lower |

As indicated in Tables 2 and 3, the hard coat films according to the present invention had very high surface hardness as compared with the corresponding substrates devoid of the hard coat layer according to the present invention. The hard coat films also maintained equivalent optical properties (transparency) as compared with the sub- Example 27

Materials used were 200.0 mmol (49.29 g) of 2-(3,4-epoxy)cyclohexylethyltrimethoxysilane (EMS) and 197.1 g of acetone. In a nitrogen stream, the materials were placed in a 5-liter separable flask (reactor) equipped with a thermometer, a stirrer, a reflux condenser, and a nitrogen inlet tube, followed by temperature rise to 50° C. to give a mixture. To the prepared mixture, was added dropwise 5.53 g (2.0 mmol in terms of potassium carbonate) of a 5% aqueous solution of potassium carbonate over 5 minutes, followed by 2.0 mol (36.0 g) of water over 20 minutes. No significant temperature rise occurred during the dropwise additions. While keeping the temperature at 50° C., the mixture was then subjected to a polycondensation reaction in a nitrogen stream for 5 hours.

A product in the reaction mixture after the polycondensation reaction was analyzed and found to have a number-average molecular weight of 1720 and a molecular-weight dispersity of 1.55. The product was found to have a T3 to T2 ratio of the T3 unit to the T2 unit of 11.0, as calculated from the $^{29}$Si-NMR spectrum of the product.

Subsequently, the reaction mixture was cooled and, simultaneously, combined with 98.4 g of methyl isobutyl ketone and 68.2 g of a 5% sodium chloride aqueous solution, followed by water washing. After separation, the aqueous layer was drawn out, and the residual liquid was combined again with 98.4 g of methyl isobutyl ketone and was washed with water until a lower layer liquid became neutral. An upper layer liquid was isolated, from which the solvent was distilled off at 50° C. and 1 mmHg. This yielded about 53 g of a colorless, transparent, liquid product (epoxy-containing polyorganosilsesquioxane; polyorganosilsesquioxane having an epoxy content of 100% by mole). The product contained 33.78% by weight of methyl isobutyl ketone.

The silsesquioxane prepared in Example 26 had a T3 to T2 ratio of 10.3, and the silsesquioxane prepared in Example 27 had a T3 to T2 ratio of 11.0. Both the silsesquioxanes were found to partially include the T2 unit.

Example 28

Materials used were 237.5 mmol (58.52 g) of 2-(3,4-epoxycyclohexyl)ethyltrimethoxysilane (EMS), 13 mmol (2.95 g) of 3-glycidyloxypropyltrimethoxysilane (hereinafter also referred to as "GMS"), and 245.9 g of acetone. In a nitrogen stream, the materials were placed in a 500-ml flask (reactor) equipped with a thermometer, a stirrer, a reflux condenser, and a nitrogen inlet tube, followed by temperature rise to 50° C. to give a mixture. To the prepared mixture, was added dropwise 6.91 g (2.5 mmol in terms of potassium carbonate) of a 5% aqueous solution of potassium carbonate over 5 minutes, followed by 2500 mmol (45.00 g) of water over 20 minutes. No significant temperature rise occurred during the dropwise additions. While keeping the temperature at 50° C., the mixture was then subjected to a polycondensation reaction in a nitrogen stream for 5 hours.

A product in the reaction mixture after the polycondensation reaction was analyzed and found to have a number-average molecular weight of 1782 and a molecular-weight dispersity of 1.52. The product was found to have a T3 to T2 ratio of the T3 unit to the T2 unit of 9.5:1, as calculated from the $^{29}$Si-NMR spectrum of the product.

Subsequently, the reaction mixture was cooled and washed with water until a lower layer liquid became neutral. An upper layer liquid was isolated, from which the solvent was distilled off at 50° C. and 1 mmHg. This yielded 60 g of a colorless, transparent, liquid product (epoxy-containing polyorganosilsesquioxane) containing 17.81% by weight of MIBK.

Example 29

Materials used were 200.0 mmol (49.28 g) of 2-(3,4-epoxycyclohexyl)ethyltrimethoxysilane (EMS), 50 mmol (11.82 g) of 3-glycidyloxypropyltrimethoxysilane (GMS), and 244.4 g of acetone. In a nitrogen stream, the materials were placed in a 500-ml flask (reactor) equipped with a thermometer, a stirrer, a reflux condenser, and a nitrogen inlet tube, followed by temperature rise to 50° C. to give a mixture. To the prepared mixture, was added dropwise 6.91 g (2.5 mmol in terms of potassium carbonate) of a 5% aqueous solution of potassium carbonate over 5 minutes, followed by 2500 mmol (45.00 g) of water over 20 minutes. No significant temperature rise occurred during the dropwise additions. While keeping the temperature at 50° C., the mixture was then subjected to a polycondensation reaction in a nitrogen stream for 5 hours.

A product in the reaction mixture after the polycondensation reaction was analyzed and found to have a number-average molecular weight of 1725 and a molecular-weight dispersity of 1.47. The product was found to have a T3 to T2 ratio of the T3 unit to the T2 unit of 10.5:1, as calculated from the $^{29}$Si-NMR spectrum of the product.

Subsequently, the reaction mixture was cooled and washed with water until a lower layer liquid became neutral. An upper layer liquid was isolated, from which the solvent was distilled off at 50° C. and 1 mmHg. This yielded 60 g of a colorless, transparent, liquid product (epoxy-containing polyorganosilsesquioxane) containing 25.84% by weight of MIBK.

Example 30

Materials used were 150.0 mmol (36.96 g) of 2-(3,4-epoxycyclohexyl)ethyltrimethoxysilane (EMS), 350 mmol (82.72 g) of 3-glycidyloxypropyltrimethoxysilane (GMS), and 478.7 g of acetone. In a nitrogen stream, the materials were placed in a 1000-ml flask (reactor) equipped with a thermometer, a stirrer, a reflux condenser, and a nitrogen inlet tube, followed by temperature rise to 50° C. to give a mixture. To the prepared mixture, was added dropwise 13.82 g (5 mmol in terms of potassium carbonate) of a 5% aqueous solution of potassium carbonate over 5 minutes, followed by 5000 mmol (90.00 g) of water over 20 minutes. No significant temperature rise occurred during the dropwise additions. While keeping the temperature at 50° C., the mixture was then subjected to a polycondensation reaction in a nitrogen stream for 5 hours.

A product in the reaction mixture after the polycondensation reaction was analyzed and found to have a number-average molecular weight of 1500 and a molecular-weight dispersity of 1.36. The product was found to have a T3 to T2 ratio of the T3 unit to the T2 unit of 8:1, as calculated from the $^{29}$Si-NMR spectrum of the product.

Subsequently, the reaction mixture was cooled and washed with water until a lower layer liquid became neutral. An upper layer liquid was isolated, from which the solvent was distilled off at 50° C. and 1 mmHg. This yielded 114 g of a colorless, transparent, liquid product (epoxy-containing polyorganosilsesquioxane) containing 26.36% by weight of MIBK.

Example 31

Materials used were 1 g (1 g as the product containing 27.23% by weight of MIBK) of the epoxy-containing polyorganosilsesquioxane prepared in Example 26, 14.6 mg (14.6 mg as a 50% solution) of the trade name WPI-124 (supplied by Wako Pure Chemical Industries, Ltd., a 50% solution of a photoacid generator), 1.5 mg of the trade name BYK-307 (supplied by BYK-Chemie GmbH, a leveling agent), and 0.253 g of methyl isobutyl ketone. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 µm. The resulting article was left stand in an oven at 70° C. for 10 minutes (for prebaking) and then irradiated with an ultraviolet ray under irradiation conditions at an irradiance of 430 mJ/cm$^2$ and an irradiation intensity of 160 W/cm$^2$. Lastly, the article was subjected to a heat treatment (aging) at 80° C. for 2 hours to cure the layer of the applied hard-coating composition. This yielded a hard coat film including the hard coat layer.

The blending amounts of starting materials for the curable compositions given in Tables 4 and 5 are indicated in part by weight. In Tables 4 and 5, the blending amounts of the "silsesquioxane prepared in Example 26", "silsesquioxane prepared in Example 27", "silsesquioxane prepared in Example 28", "silsesquioxane prepared in Example 29", and "silsesquioxane prepared in Example 30" are indicated as amounts excluding MIBK; and the blending amount of WPI-124 is indicated as an amount excluding the solvent. The contents of the solvents are not shown in Tables 4 and 5.

Example 32

The curable composition (hard-coating composition) prepared in Example 31 was applied onto a PET film (trade name KEB03 W, supplied by Teijin DuPont Films Japan Limited) by flow casting using a wire bar so as to form a hard coat layer having a thickness after curing of 30 µm. The resulting article was left stand in an oven at 70° C. for 10 minutes (for prebaking), and then irradiated with an ultraviolet ray under irradiation conditions at an irradiance of 430 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 33

Materials used were 1 g (1 g as the product containing 27.23% by weight of MIBK) of the epoxy-containing polyorganosilsesquioxane prepared in Example 26, 14.6 mg (14.6 mg as a 50% solution) of the trade name WPI-124 (supplied by Wako Pure Chemical Industries, Ltd., a 50% solution of a photoacid generator), 1.5 mg of the trade name BYK-307 (supplied by BYK-Chemie GmbH, a leveling agent), 0.253 g of methyl isobutyl ketone, and 36.4 mg of ethylene glycol monovinyl ether (supplied by Tokyo Chemical Industry Co., Ltd.). The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 µm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 34

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of ethylene glycol monovinyl ether (supplied by Tokyo Chemical Industry Co., Ltd.). The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 µm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 35

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of cyclohexanedimethanol monovinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 µm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 36

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of triethylene glycol monovinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 37

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of diethylene glycol monovinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 38

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of hydroxybutyl vinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 39

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of isobutyl vinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 40

Materials used were 1 g (1 g as the product containing 33.78% by weight of MIBK) of the epoxy-containing polyorganosilsesquioxane prepared in Example 27, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of cyclohexanedimethanol divinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 41

Materials used were 1 g (1 g as the product containing 33.78% by weight of MIBK) of the epoxy-containing polyorganosilsesquioxane prepared in Example 26, 13.2 mg (13.2 mg as a 50% solution) of the trade name WPI-124 (supplied by Wako Pure Chemical Industries, Ltd., a 50% solution of a photoacid generator), 1.3 mg of the trade name BYK-307 (supplied by BYK-Chemie GmbH, a leveling agent), 0.104 g of methyl isobutyl ketone, and 33.1 mg of diethylene glycol divinyl ether. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 42

The hard-coating composition prepared in Example 31 was applied onto a PET film (trade name KEB03 W, supplied by Teijin DuPont Films Japan Limited) by flow casting using a wire bar so as to form a hard coat layer having a thickness after curing of 30 μm. The resulting article was left stand in an oven at 70° C. for 10 minutes (for prebaking), and then irradiated with an ultraviolet ray under irradiation conditions at an irradiance of 155 mJ/cm$^2$ and an irradiation intensity of 160 W/cm$^2$ to cure the layer of the applied hard-coating composition, without heat treatment subsequent to the UV irradiation. This yielded a hard coat film including the hard coat layer.

Example 43

A hard coat film was prepared by the same procedure under the same conditions as in Example 34, except for using no vinyl ether compound as a component of the hard-coating composition.

Example 44

Materials used were 1 g (1 g as the product containing 17.81% by weight of MIBK) of the epoxy-containing polyorganosilsesquioxane prepared in Example 28, 16.4 mg (16.4 mg as a 50% solution) of the trade name WPI-124 (supplied by Wako Pure Chemical Industries, Ltd., a 50% solution of a photoacid generator), the trade name BYK-307 (supplied by BYK-Chemie GmbH, a leveling agent), and 0.37 g of methyl isobutyl ketone. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 40 μm. The resulting article was left stand in an oven at 70° C. for 10 minutes (for prebaking) and then irradiated with an ultraviolet ray under irradiation conditions at an irradiance of 430 mJ/cm$^2$ and an irradiation intensity of 160 W/cm$^2$. The article was left stand in an oven at 80° C. for 2 hours (for prebaking) to cure the layer of the applied hard-coating composition. This yielded a hard coat film including the hard coat layer.

Example 45

Materials used were 1 g (1 g as the product containing 25.84% by weight of MIBK) of the epoxy-containing polyorganosilsesquioxane prepared in Example 29, 14.8 mg (14.8 mg as a 50% solution) of the trade name WPI-124 (supplied by Wako Pure Chemical Industries, Ltd., a 50% solution of a photoacid generator), the trade name BYK-307 (supplied by BYK-Chemie GmbH, a leveling agent), and 0.24 g of methyl isobutyl ketone. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 40 μm. The resulting article was left stand in an oven at 70° C. for 10 minutes (for prebaking) and then irradiated with an ultraviolet ray under irradiation conditions at an irradiance of 430 mJ/cm$^2$ and an irradiation intensity of 160 W/cm$^2$. The article was left stand in an oven at 80° C. for 2 hours (for post-baking) to cure the layer of the applied hard-coating composition. This yielded a hard coat film including the hard coat layer.

Example 46

Materials used were 1 g (1 g as the product containing 26.36% by weight of MIBK) of the epoxy-containing polyorganosilsesquioxane prepared in Example 30, 14.7 mg (14.7 mg as a 50% solution) of the trade name WPI-124 (supplied by Wako Pure Chemical Industries, Ltd., a 50% solution of a photoacid generator), the trade name BYK-307 (supplied by BYK-Chemie GmbH, a leveling agent), and 0.23 g of methyl isobutyl ketone. The materials were placed in a 6-cc dark brown sample vial, stirred and mixed using a vibrator, and yielded a curable composition (hard-coating composition).

The above-prepared hard-coating composition was applied onto a PET film (trade name KEB03 W, supplied by Teijin DuPont Films Japan Limited) by flow casting using a wire bar so as to form a hard coat layer having a thickness after curing of 40 μm. The resulting article was left stand in an oven at 70° C. for 10 minutes (for prebaking) and then irradiated with an ultraviolet ray under irradiation conditions at an irradiance of 430 mJ/cm$^2$ and an irradiation intensity of 160 W/cm$^2$. The article was left stand in an oven at 80° C. for 2 hours (for post-baking) to cure the layer of the applied hard-coating composition. This yielded a hard coat film including the hard coat layer.

The hard coat films prepared in Examples 31 to 46 were subjected to various evaluations by methods as follows. Results are presented in Tables 4 and 5.

(1) Haze and Total Luminous Transmittance The haze and total luminous transmittance of each of the hard coat films were measured using a haze meter (NDH-300A, supplied by Nippon Denshoku Industries Co., Ltd.).

(2) Yellowness b*

The yellowness b* of each hard coat film was measured using a difference colorimeter (NDH-300A, supplied by Nippon Denshoku Industries Co., Ltd.).

(3) Surface Hardness (Pencil Hardness)

The pencil hardness of the hard coat layer surface in each hard coat film was measured in conformity to JIS K 5600-5-4.

(4) Thermal Yellowing after Curing

Each of the hard coat films prepared in Examples 34 to 41 was subjected to a heat treatment at the heating temperature for the heating time as given in "thermal yellowing after curing" in Table 4. The yellowness b* of the hard coat film after the heat treatment was measured using a difference colorimeter (NDH-300A supplied by Nippon Denshoku Industries Co., Ltd.). Results are presented in Table 4.

TABLE 4

|  |  |  | Example 31 | Example 32 | Example 33 | Example 34 | Example 35 | Example 36 | Example 37 | Example 38 | Example 39 | Example 40 | Example 41 |
|---|---|---|---|---|---|---|---|---|---|---|---|---|---|
| Curable composition | Epoxy-containing polyorgano-silsesquioxane | Silsesquioxane prepared in Example 26 | 100 | 100 | 100 | — | — | — | — | — | — | — | 100 |
|  |  | Silsesquioxane prepared in Example 27 | — | — | — | 100 | 100 | 100 | 100 | 100 | 100 | 100 | — |
|  |  | Silsesquioxane prepared in Example 28 | — | — | — | — | — | — | — | — | — | — | — |
|  |  | Silsesquioxane prepared in Example 29 | — | — | — | — | — | — | — | — | — | — | — |
|  |  | Silsesquioxane prepared in Example 30 | — | — | — | — | — | — | — | — | — | — | — |
|  | Vinyl ether compound | EGVE | — | — | 5 | 5 | — | — | — | — | — | — | — |
|  |  | CHXDM-VE | — | — | — | — | 5 | — | — | — | — | — | — |
|  |  | TEG-VE | — | — | — | — | — | 5 | — | — | — | — | — |
|  |  | DEG-VE | — | — | — | — | — | — | 5 | — | — | — | — |
|  |  | HBVE | — | — | — | — | — | — | — | 5 | — | — | — |
|  |  | IBVE | — | — | — | — | — | — | — | — | 5 | — | — |
|  |  | CHXDMDVE | — | — | — | — | — | — | — | — | — | 5 | — |
|  |  | DEGDVE | — | — | — | — | — | — | — | — | — | — | 5 |
|  | Leveling agent | BYK-307 | 0.2 | 0.2 | 0.2 | 0.2 | 0.2 | 0.2 | 0.2 | 0.2 | 0.2 | 0.2 | 0.2 |
|  | Initiator | WPI-124 | 1 | 1 | 1 | 1 | 1 | 1 | 1 | 1 | 1 | 1 | 1 |
| Curing conditions | UV curing (UV irradiance) | mJ/cm² | 430 | 430 | 155 | 155 | 155 | 155 | 155 | 155 | 155 | 155 | 155 |
|  | Thermal curing | °C. | 80 | none | none | none | none | none | none | none | none | none | none |
|  |  | hr | 2 | none | none | none | none | none | none | none | none | none | none |
| Evaluations | Hard coat layer thickness (μm) |  | 30 | 27 | 30 | 32 | 32 | 36 | 36 | 32 | 35 | 32 | 35 |
|  | Haze (%) |  | 0.77 | 0.64 | 0.58 | 0.52 | 0.55 | 0.9 | 1.05 | 1.01 | 0.5 | 0.56 | 0.95 |
|  | Total luminous transmittance (%) |  | 91.85 | 91.81 | 91.89 | 92.03 | 91.85 | 91.55 | 91.88 | 91.9 | 92.1 | 91.68 | 91.82 |
|  | Yellowness b* |  | 0.79 | 0.72 | 0.75 | 0.64 | 0.66 | 0.8 | 0.85 | 0.77 | 0.72 | 0.73 | 0.86 |
|  | Pencil hardness |  | 9H | 9H | 8H | 9H | 9H | 9H | 8H | 8H | 9H | 9H | 8H |
|  | Thermal yellowing after curing | Heating temperature (° C.) | — | — | — | 80 | 50 | 80 | 80 | 80 | 80 | 80 | 80 |
|  |  | Heating time (min.) | — | — | — | 240 | 240 | 240 | 240 | 240 | 240 | 30 | 240 |
|  |  | Yellowness b* after heating | — | — | — | 0.8 | 0.8 | 0.94 | 0.92 | 1.57 | 1.49 | 1.51 | 1.53 |

TABLE 5

|  |  |  | Example 42 | Example 43 | Example 44 | Example 45 | Example 46 |
|---|---|---|---|---|---|---|---|
| Curable composition | Epoxy-containing polyorganosilsesquioxane | Silsesquioxane prepared in Example 26 | 100 | — | — | — | — |
|  |  | Silsesquioxane prepared in Example 27 | — | 100 | — | — | — |
|  |  | Silsesquioxane prepared in Example 28 | — | — | 100 | — | — |
|  |  | Silsesquioxane prepared in Example 29 | — | — | — | 100 | — |
|  |  | Silsesquioxane prepared in Example 30 | — | — | — | — | 100 |
|  | Vinyl ether compound | EGVE | — | — | — | — | — |
|  |  | CHXDM-VE | — | — | — | — | — |
|  |  | TEG-VE | — | — | — | — | — |
|  |  | DEG-VE | — | — | — | — | — |
|  |  | HBVE | — | — | — | — | — |
|  |  | IBVE | — | — | — | — | — |
|  |  | CHXDMDVE | — | — | — | — | — |
|  |  | DEGDVE | — | — | — | — | — |

TABLE 5-continued

|  |  |  | Example 42 | Example 43 | Example 44 | Example 45 | Example 46 |
|---|---|---|---|---|---|---|---|
|  | Leveling agent | BYK-307 | 0.2 | 0.2 | 0.2 | 0.2 | 0.2 |
|  | Initiator | WPI-124 | 1 | 1 | 1 | 1 | 1 |
| Curing conditions | UV curing (UV irradiance) | mJ/cm$^2$ | 155 | 155 | 430 | 430 | 430 |
|  | Thermal curing | ° C. | none | none | 80 | 80 | 80 |
|  |  | hr | none | none | 2 | 2 | 2 |
| Evaluations | Hard coat layer thickness (□m) |  | 30 | 25 | 40 | 40 | 37 |
|  | Haze (%) |  | 0.62 | 0.75 | 0.8 | 0.75 | 0.96 |
|  | Total luminous transmittance (%) |  | 91.87 | 91.87 | 91.81 | 91.91 | 92.23 |
|  | Yellowness b* |  | 0.86 | 0.79 | 0.82 | 0.86 | 0.6 |
|  | Pencil hardness |  | 6H | 6H | 8H | 8H | 9H |

The abbreviations in Tables 4 and 5 refer to as follows:
EGVE: ethylene glycol monovinyl ether
CHXDM-VE: cyclohexanedimethanol monovinyl ether
TEG-VE: triethylene glycol monovinyl ether
DEG-VE: diethylene glycol monovinyl ether
HBVE: hydroxybutyl vinyl ether
IBVE: isobutyl vinyl ether
CHXDMDVE: cyclohexanedimethanol divinyl ether
DEGDVE: diethylene glycol divinyl ether
WPI-124: trade name WPI-124, supplied by Wako Pure Chemical Industries, Ltd., a 50% solution of a photoacid generator As is indicated in Tables 4 and 5, the hard coat films according to the present invention (Examples 31 to 46) each had high surface hardness and excellent transparency.

In particular, examples further using a vinyl ether compound in combination with the epoxy-containing polyorganosilsesquioxane as cationically curable compounds (e.g., Examples 33 to 41) gave hard coat films that had very high surface hardness even when irradiated with an ultraviolet ray at a lower irradiance, as compared with examples using no vinyl ether compound (e.g., Examples 31, 32, 42, and 43). This indicates that the combination use of a vinyl ether compound with the polyorganosilsesquioxane both as cationically curable compounds allows hard coat films to be produced at a higher line speed, and this contributes to very excellent productivity.

Examples using a hydroxy-containing vinyl ether compound in combination with the polyorganosilsesquioxane as cationically curable compounds (e.g., Examples 34 to 38) gave hard coat films that had still higher surface hardness and still better resistance to thermal yellowing, as compared with examples using a vinyl ether compound devoid of hydroxy groups in combination with the polyorganosilsesquioxane (e.g., Examples 39 to 41).

The hard coat films prepared in Examples 31 to 46 were examined to evaluate the heat resistance ($T_{d5}$) and flexibility by the above methods and were each found to have excellent heat resistance with a $T_{d5}$ of 380° C. or higher and to have excellent flexibility and processability with a diameter of 25 mm or less in the mandrel test at a hard coat layer thickness of 30 μm.

Example 47

Preparation of Composition for Adhesive

A composition for adhesive (adhesive composition) was prepared by mixing materials. The materials were 100 parts by weight of the epoxy-containing polyorganosilsesquioxane (S-1) (cationically polymerizable compound) prepared in Example 1, 50 parts by weight of propylene glycol monomethyl ether acetate, 0.1 part by weight of the trade name San-Aid SI-150L (supplied by SANSHIN CHEMICAL INDUSTRY CO., LTD., an antimony-containing sulfonium salt), and 0.005 part by weight of the trade name Auxiliary for San-Aid SI Series (supplied by SANSHIN CHEMICAL INDUSTRY CO., LTD., (4-hydroxyphenyl) dimethylsulfonium methylsulfite)).

Example 48

Formation of Adhesive Layer A silane coupling agent (trade name KBE403, supplied by Shin-Etsu Chemical Co., Ltd.) was applied onto one side of a glass plate (4 inches, supplied by SCHOTT Nippon K.K.) by spin coating and heated at 100° C. for 15 minutes to form a silane coupling agent layer. The adhesive composition prepared in Example 47 was further applied thereonto by spin coating, then heated at 60° C. for 10 minutes to form a 5-μm thick adhesive layer, and yielded a glass plate with adhesive layer. This had a layer configuration including the glass plate, the silane coupling agent layer, and the adhesive layer disposed in this order.

Formation of Silane Coupling Agent Layer

A silane coupling agent (trade name KBE403, supplied by Shin-Etsu Chemical Co., Ltd.) was applied to one side of a glass plate (4 inches, supplied by SCHOTT Nippon K.K.) by spin coating, heated at 100° C. for 15 minutes to form a silane coupling agent layer, and yielded a glass plate with silane coupling agent layer. This had a layer configuration including the glass plate and the silane coupling agent layer disposed in this order.

Preparation of Bonded Article (Laminate)

The above-prepared glass plate with adhesive layer and the above-prepared glass plate with silane coupling agent layer were applied to each other with compression at a pressure of 200 g/cm$^2$ with heating at 60° C. so that the adhesive layer of the former faced the silane coupling agent layer of the latter. The resulting article was heated at 150° C. for 30 minutes, and then further heated at 170° C. for 30 minutes, and yielded a bonded article (laminate). The laminate had a layer configuration of the glass plate, the silane coupling agent layer, a cured product layer of adhesive composition (adhesive layer), the silane coupling agent layer, and the glass plate disposed in this order.

The above-prepared adhesive composition and bonded article (laminate) were subjected to evaluations as follows.

Adhesion Evaluation

The adhesion of a coat layer (adhesive layer) derived from the adhesive composition prepared in Example 47 was evaluated by a cross-cut test according to JIS K 5400-8.5. Specifically, the glass plate with adhesive layer prepared in Example 48 was heated at 150° C. for 30 minutes, further heated at 170° C. for 30 minutes, and yielded a sample. The coat layer in the sample was a layer of the cured product of the adhesive composition prepared in Example 47.

As a result of the cross-cut test, no peeling of the coat layer from the glass plate was observed, and the coat layer was found to have excellent adhesion. The base glass plate herein had a layer configuration of the glass plate and the silane coupling agent layer disposed in this order.

Adhesiveness Evaluation

A razor blade was inserted into the adhesive interface of the bonded article (laminate) prepared in Example 48. As a result, no delamination at the adhesive face occurred, and this demonstrated that the adhesive layer in the bonded article had excellent adhesiveness.

INDUSTRIAL APPLICABILITY

The curable composition according to the present invention, i.e., the curable composition containing the polyorganosilsesquioxane according to the present invention, when cured, gives a cured product that offers high surface hardness and good heat resistance, is highly flexible, has excellent processability, and offers excellent adhesiveness and adhesion to an adherend. Consequently, the curable composition according to the present invention is advantageously usable, in particular, as a hard coat layer-forming curable composition and as an adhesive composition.

The invention claimed is:

1. An adhesive layer comprising a curable composition comprising a polyorganosilsesquioxane,
the polyorganosilsesquioxane comprising:
a constitutional unit represented by Formula (I); and
a constitutional unit represented by Formula (II),
in a mole ratio of the constitutional unit represented by Formula (I) to the constitutional unit represented by Formula (II) of from 5 to 18,
a constitutional unit represented by Formula (2),
the polyorganosilsesquioxane having a total proportion of the constitutional unit represented by Formula (I) and the constitutional unit represented by formula (II) of 95% to 99% by mole based on a total amount (100% by mole) of all siloxane constitutional units,
the polyorganosilsesquioxane having a number-average molecular weight of 1100 to 2600 and a molecular-weight dispersity (weight-average: molecular weight to number-average molecular weight ratio) of 1.1 to 2.0,
Formulae (I), (II), and (2) expressed as follows:

$$[R^a SiO_{3/2}] \quad (I)$$

wherein $R^a$ is selected from:
a group represented by Formula (1a);
a group represented by Formula (1d),
Formulae (1a) and (1d) expressed as follows:

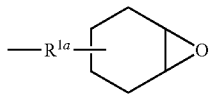
(1a)

wherein $R^{1a}$ represents an ethylene group,

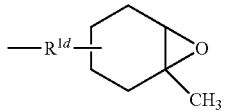
(1d)

wherein $R^{1d}$ represents an ethylene group, $$[R^b SiO(OR^c)] \quad (II)$$

wherein $R^b$ is selected from:
a group represented by Formula (1a); and
a group represented by Formula (1d),
Formulae (1a) and (1d) expressed as follows:

(1a)

wherein $R^{1a}$ represents an ethylene group,

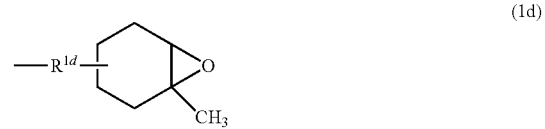
(1d)

wherein $R^{1d}$ represents an ethylene group, and $R^c$ is selected from a hydrogen atom and a $C_1$-$C_4$ alkyl group, and $$[R^2 SiO_{3/2}] \quad (2)$$

wherein $R^2$ is an unsubstituted phenyl group.

2. The adhesive layer according to claim 1,
the curable composition further comprising
a curing catalyst.

3. The adhesive layer according to claim 2,
wherein the curing catalyst comprises a cationic photoinitiator.

4. The adhesive layer according to claim 2,
wherein the curing catalyst comprises a cationic thermal initiator.

5. The adhesive layer according to claim 1,
the curable composition further comprising
a vinyl ether compound.

6. The adhesive layer according to claim 1,
the curable composition further comprising
a vinyl ether compound containing a hydroxy group in molecule.

7. An adhesive sheet comprising:
a substrate; and
the adhesive layer according to claim 1 disposed on or over the substrate.

8. The adhesive sheet according to claim 7,
wherein the substrate is a semiconductor substrate.

9. A laminate comprising
three or more layers,
the three or more layers comprising:
two adherend layers; and
an adhesive layer disposed between the two adherend layers, the adhesive layer being a layer of a cured product of the adhesive layer according to claim 1.

10. The laminate according to claim 9,
wherein the adherend layer is a semiconductor substrate.

11. A method for producing a laminate comprising three or more layers, the three or more layers comprising two adherend layers and an adhesive layer disposed between the two adherend layers, the method comprising the steps of:
forming the adhesive layer according to claim 1 on an adherend layer;

applying another adherend layer to the formed adhesive layer to obtain a resulting article; and subjecting the resulting article to light irradiation and/or heating to cure the adhesive layer.

* * * * *